(12) United States Patent
Yamashita et al.

(10) Patent No.: US 12,222,359 B2
(45) Date of Patent: Feb. 11, 2025

(54) SAMPLE CONTAINER GRIPPING APPARATUS, SAMPLE CONVEYANCE APPARATUS, AND CONNECTION APPARATUS

(71) Applicant: Hitachi High-Tech Corporation, Tokyo (JP)

(72) Inventors: Taichiro Yamashita, Tokyo (JP); Shigeki Yamaguchi, Tokyo (JP); Masashi Endo, Tokyo (JP)

(73) Assignee: HITACHI HIGH-TECH CORPORATION, Tokyo (JP)

( * ) Notice: Subject to any disclaimer, the term of this patent is extended or adjusted under 35 U.S.C. 154(b) by 379 days.

(21) Appl. No.: 17/770,077

(22) PCT Filed: Jul. 29, 2020

(86) PCT No.: PCT/JP2020/029073
§ 371 (c)(1),
(2) Date: Apr. 19, 2022

(87) PCT Pub. No.: WO2021/084823
PCT Pub. Date: May 6, 2021

(65) Prior Publication Data
US 2022/0357354 A1    Nov. 10, 2022

(30) Foreign Application Priority Data
Oct. 31, 2019 (JP) .................................. 2019-198076

(51) Int. Cl.
*G01N 35/04* (2006.01)

(52) U.S. Cl.
CPC .................................. *G01N 35/04* (2013.01)

(58) Field of Classification Search
CPC ......... G01N 35/04; G01N 2035/00306; G01N 2035/0465; G01N 2035/0467; G01N 35/0099; G01N 35/10
See application file for complete search history.

(56) References Cited

U.S. PATENT DOCUMENTS 3,753,657 A * 8/1973 Downing ................ G01N 35/10
422/65
2012/0258026 A1* 10/2012 Naumann ............. B01L 3/0234
422/521
(Continued)

FOREIGN PATENT DOCUMENTS

DE    10 2011 055 899 A1    6/2013
EP         1 980 858 A2    10/2008
(Continued)

OTHER PUBLICATIONS

JP-6170917-B2 translation (Year: 2017).*
(Continued)

*Primary Examiner* — Kyle T Johnson
(74) *Attorney, Agent, or Firm* — MATTINGLY & MALUR, PC

(57) ABSTRACT

Provided are a sample container gripping device capable of gripping a sample container without allowing foreign matter to be mixed into a sample, a sample conveyance device comprising the sample container gripping device, and a connection device. This sample container gripping device for gripping a sample container accommodating a sample is characterized by comprising a pair of clamps that are kept outside of a conveyance path, which is for conveying a sample carrier upon which the sample container is placed, until the sample carrier is conveyed to a prescribed position and, when the sample carrier is conveyed to the prescribed position, move horizontally toward the conveyance path so (Continued)

as to grip the sample container from the horizontal direction at the prescribed position.

8 Claims, 21 Drawing Sheets

(56) References Cited

U.S. PATENT DOCUMENTS

| | | | | |
|---|---|---|---|---|
| 2013/0239527 | A1* | 9/2013 | Clarke | B65B 69/00 |
| | | | | 53/381.1 |
| 2015/0125247 | A1* | 5/2015 | Ford | F27B 17/02 |
| | | | | 414/586 |
| 2017/0212139 | A1* | 7/2017 | Jaeggi | G01N 35/0099 |
| 2021/0062553 | A1* | 3/2021 | Yamashita | G01N 35/025 |
| 2022/0357354 | A1* | 11/2022 | Yamashita | G01N 35/0099 |
| 2024/0142479 | A1* | 5/2024 | Yamaguchi | G01N 35/025 |

FOREIGN PATENT DOCUMENTS

| | | |
|---|---|---|
| JP | 47-034768 A | 12/1972 |
| JP | 62-282885 A | 12/1987 |
| JP | 05-032313 U | 4/1993 |
| JP | H05118401 A * | 5/1993 |
| JP | 3702066 B2 | 10/2005 |
| JP | 2015-213466 A | 12/2015 |
| JP | 2017-1888 A | 1/2017 |
| JP | 2017001888 A * | 1/2017 ........... B65G 47/847 |
| JP | 2017-129576 A | 7/2017 |
| JP | 6170917 B2 * | 7/2017 ........... B25J 15/022 |
| JP | 2018-000340 A | 1/2018 |
| JP | 2023133238 A * | 9/2023 ........ G01N 35/0098 |
| WO | 2014/002953 A1 | 1/2014 |
| WO | WO-2024020035 A2 * | 1/2024 ............. B01L 1/025 |

OTHER PUBLICATIONS

JP-2017001888-A translation (Year: 2017).*
JP-2023133238-A translation (Year: 2023).*
JP-H05118401-A translation (Year: 1993).*
Mechanical Design of a Robot's Gripper (Year: 2015).*
Design and Simulation of a New Concentric Gripper with Two-Finger and Support Bar Driven by a Wedge Cam (Year: 2024).*
Extended European Search Report received in corresponding European Application No. 20880376.7 dated Oct. 5, 2023.
International Search Report of PCT/JP2020/029073 dated Sep. 15, 2020.
International Preliminary Report on Patentability dated Dec. 28, 2020.

* cited by examiner

SAMPLE CONTAINER GRIPPING APPARATUS, SAMPLE CONVEYANCE APPARATUS, AND CONNECTION APPARATUS

TECHNICAL FIELD

The present invention relates to a sample container gripping apparatus for gripping a sample container in a connection apparatus that connects a sample conveyance apparatus that conveys a sample container accommodating a sample such as blood or urine and an analysis apparatus that analyzes the sample to each other, or in the sample conveyance apparatus.

BACKGROUND ART

In a hospital or an examination facility, a sample such as blood or urine provided from a subject is analyzed for clinical examination using an automated sample examination system. The automated sample examination system includes a pre-processing apparatus that performs various pieces of pre-processing on a sample container accommodating a sample, a sample conveyance apparatus that conveys the sample container, an analysis apparatus that collects the sample from the sample container and analyzes the sample, and a connection apparatus that connects between the sample conveyance apparatus and the analysis apparatus. In addition, in the automated sample examination system, it is required to accurately arrange the sample container at a prescribed position, for example, a position where the sample is collected from the sample container.

PTL 1 discloses an apparatus including a pair of centering jaws that accurately grips, when a carrier holding a sample container and conveyed to a prescribed position by a carousel has been moved upward, the sample container at a position to which the carrier has been moved.

CITATION LIST

Patent Literature

PTL 1: JP 2017-129576 A

SUMMARY OF INVENTION

Technical Problem

However, in PTL 1, since the centering jaw is arranged on a conveyance path on which the sample container is conveyed, foreign matter such as abrasion powder generated from the centering jaw may be mixed into the sample in the sample container. The mixing of the foreign matter into the sample lowers the analysis accuracy of the analysis apparatus.

In this regard, an object of the present invention is to provide a sample container gripping apparatus capable of gripping a sample container without allowing foreign matter to be mixed into a sample, a sample conveyance apparatus including the sample container gripping apparatus, and a connection apparatus.

Solution to Problem

In order to achieve the above object, the present invention provides a sample container gripping apparatus for gripping a sample container accommodating a sample, the sample container gripping apparatus including: a pair of clamps that are kept outside of a conveyance path, which is for conveying a sample carrier upon which the sample container is placed, until the sample carrier is conveyed to a prescribed position and, when the sample carrier is conveyed to the prescribed position, move horizontally toward the conveyance path so as to grip the sample container from the horizontal direction at the prescribed position.

In addition, the present invention provides a sample conveyance apparatus that conveys a sample container accommodating a sample, and includes the sample container gripping apparatus.

In addition, the present invention provides a connection apparatus that connects between a sample conveyance apparatus that conveys a sample container accommodating a sample and an analysis apparatus that analyzes the sample, the connection apparatus including the sample container gripping apparatus.

Advantageous Effects of Invention

According to the present invention, it is possible to provide the sample container gripping apparatus capable of gripping a sample container without allowing foreign matter to be mixed into a sample, the sample conveyance apparatus including the sample container gripping apparatus, and the connection apparatus.

DESCRIPTION OF EMBODIMENTS

Embodiment 1

Hereinafter, the present embodiment will be described with reference to the drawings. Note that, in some drawings, a top-bottom direction, a left-right direction, and a front-back direction are illustrated in order to clarify directions.

Figure 1:
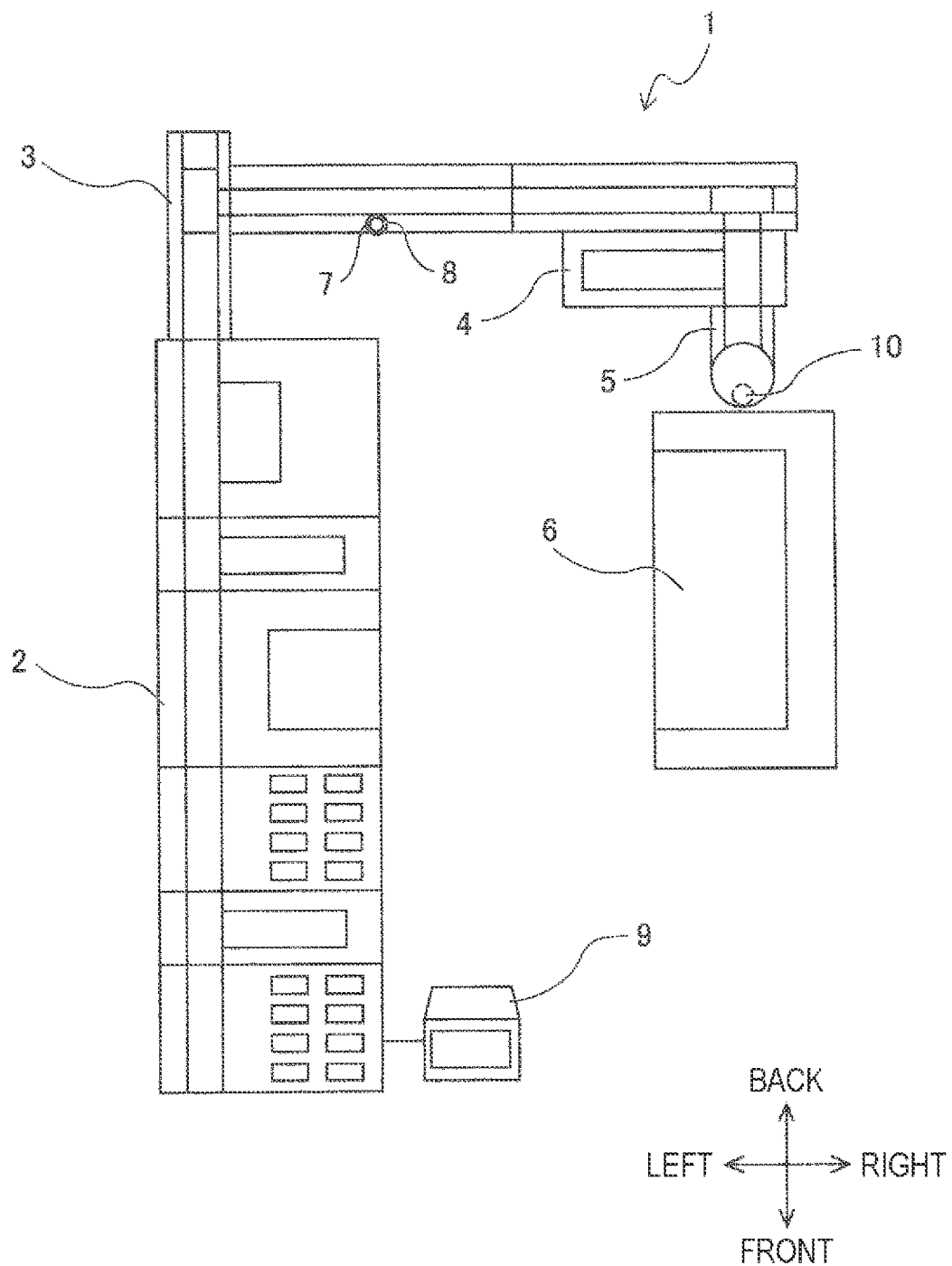
FIG. 1 is a diagram illustrating an overall configuration of an automated sample examination system of Embodiment 1.

An automated sample examination system 1 of the present embodiment will be described with reference to FIG. 1. The automated sample examination system 1 is a system that performs various pieces of pre-processing on a sample such as blood or urine provided from a subject and then performs analysis for clinical examination. The automated sample examination system 1 includes a pre-processing apparatus 2, a sample conveyance apparatus 3, a sample buffer 4, a connection apparatus 5, an analysis apparatus 6, and a control apparatus 9. Each apparatus will be described below.

The pre-processing apparatus 2 is an apparatus that performs pre-processing on the sample prior to analysis of the sample. The pre-processing includes processing of receiving a sample container 7 accommodating the sample, centrifugation processing, processing of measuring a liquid amount in the sample container 7, processing of opening the sample container 7, dispensing processing of dispensing the sample, and the like.

The sample conveyance apparatus 3 is an apparatus that conveys a sample carrier 8 upon which one sample container 7 is placed between the pre-processing apparatus 2 and the analysis apparatus 6. The sample conveyance apparatus 3 is provided with two conveyance paths that are a forward path and a return path for the sample carrier 8.

The sample buffer 4 is an apparatus that temporarily stores the sample carrier 8 in order to prevent the sample carrier 8 from being jammed on the conveyance path. The sample buffer 4 is provided as necessary.

The connection apparatus 5 is an apparatus that connects between the sample conveyance apparatus 3 and the analysis apparatus 6, and conveys the sample carrier 8 to a sample collecting position 10 which is a position where the analysis apparatus 6 collects the sample. The connection apparatus 5 will be described later with reference to FIGS. 2 and 3.

The analysis apparatus 6 is an apparatus that analyzes the sample collected from the sample container 7 on the sample carrier 8 conveyed to the sample collecting position 10. The sample is collected by a nozzle or the like inserted from above into the sample container 7 at the sample collecting position 10.

The control apparatus 9 is, for example, a central processing unit (CPU), and controls an operation of each apparatus on the basis of information acquired by a sensor or the like.

Figure 2:
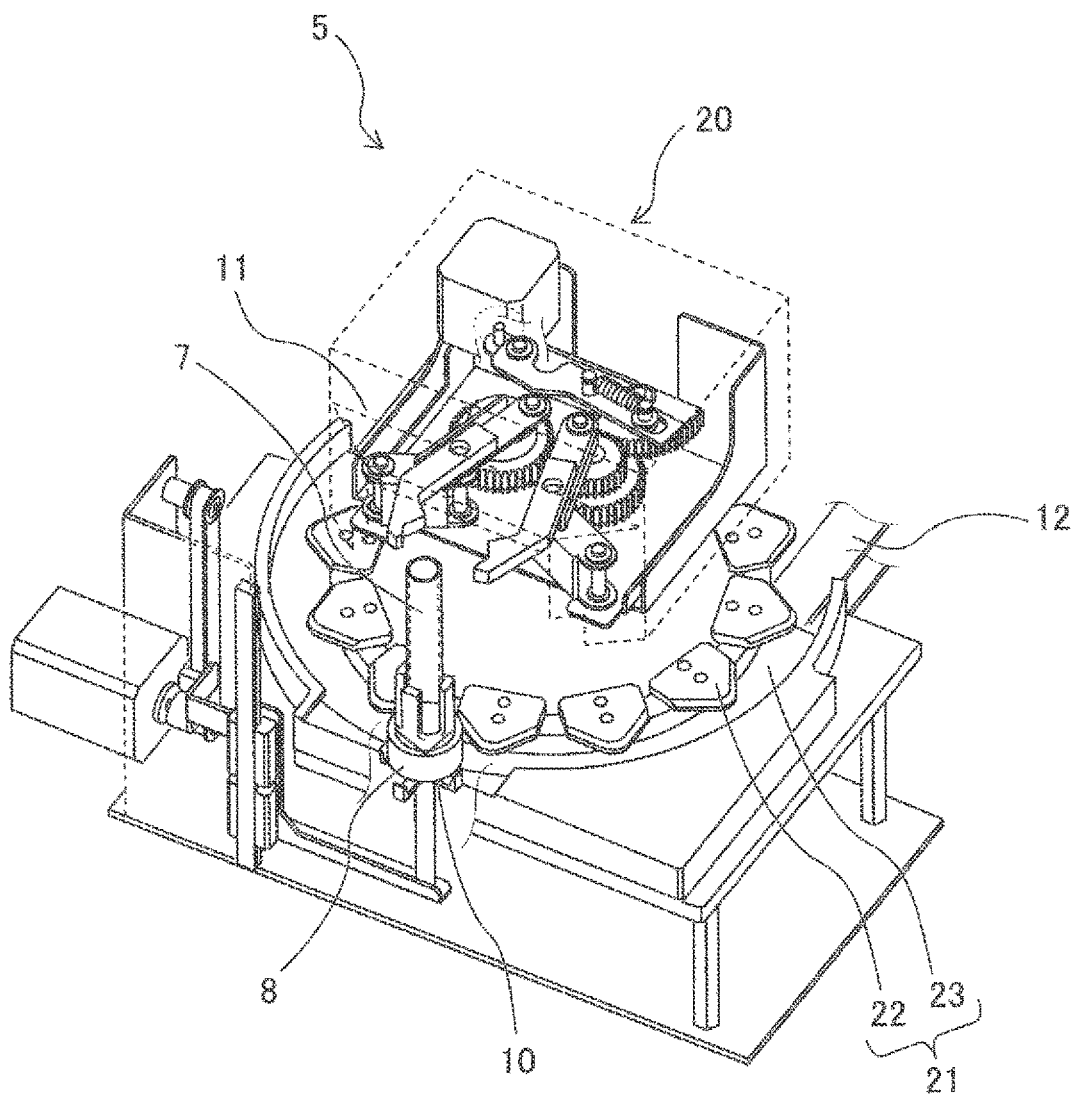
FIG. 2 is a perspective view illustrating a connection apparatus of Embodiment 1.
Figure 2:
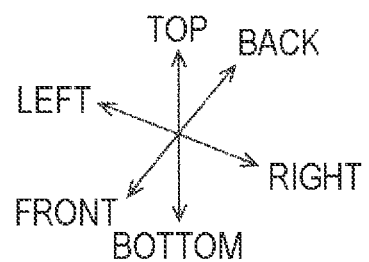
Figure 3:
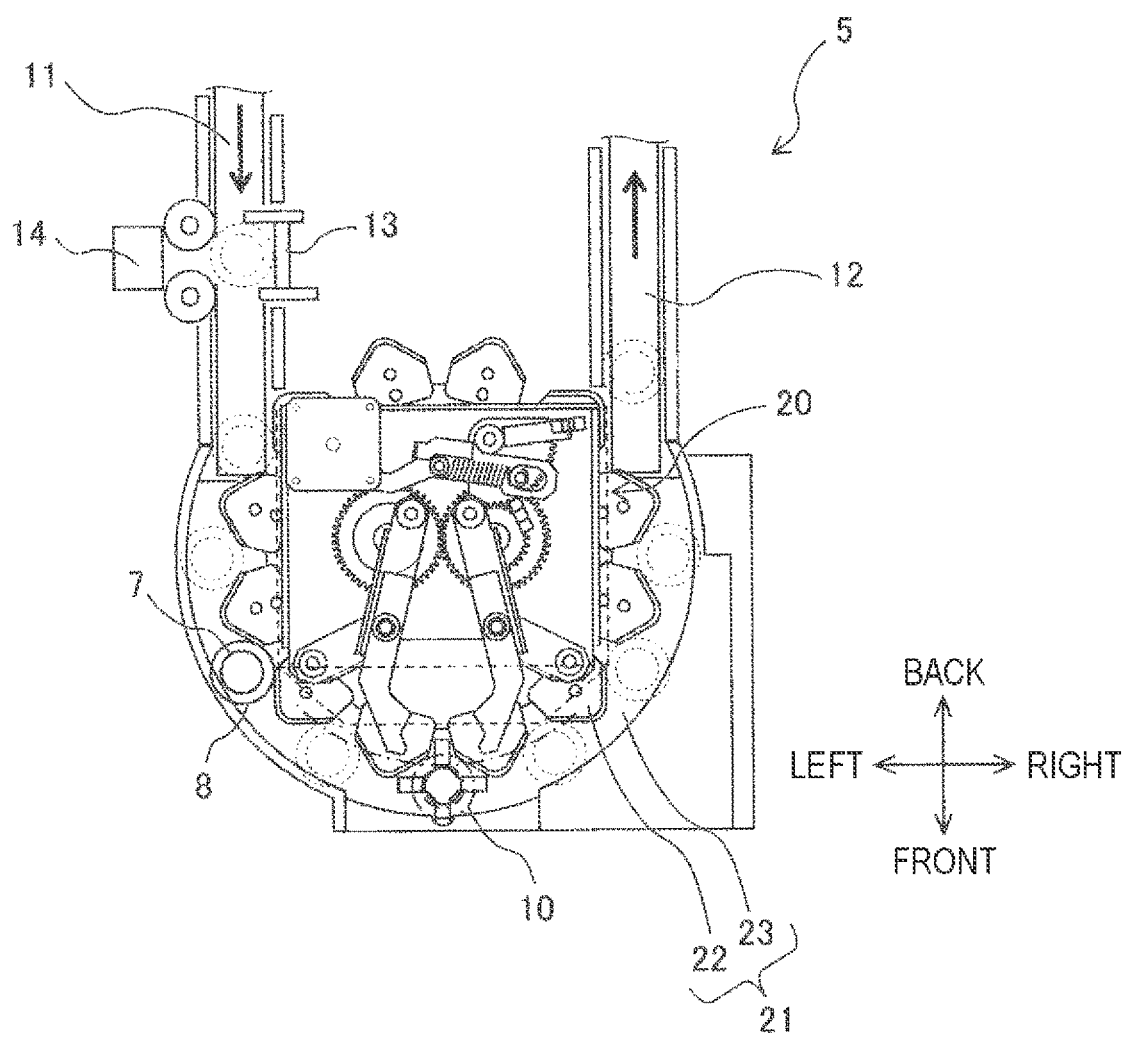
FIG. 3 is a top view illustrating the connection apparatus of Embodiment 1.

The connection apparatus 5 of the present embodiment will be described with reference to FIGS. 2 and 3. The connection apparatus 5 includes a carousel 21 and a sample container gripping apparatus 20.

The carousel 21 is an apparatus that conveys the sample carrier 8 to the sample collecting position 10, and includes a plurality of claws 22 and an arc-shaped conveyance path 23. The claws 22 are thin plates whose planar shape is a substantially pentagonal shape, are arranged at equal intervals along the conveyance path 23 in such a manner that apexes thereof face an outer circumference, and rotate along the conveyance path 23. Since a gap for holding the sample carrier 8 is provided between the claws 22, the sample carriers 8 are conveyed on the conveyance path 23 at equal intervals by the rotation of the claws 22.

The conveyance path 23 is connected to a sample conveying-in path 11 through which the sample carrier 8 is conveyed in from the sample conveyance apparatus 3 and a sample conveying-out path 12 through which the sample carrier 8 is conveyed out to the sample conveyance apparatus 3. The sample carrier 8 conveyed in through the sample conveying-in path 11 is stopped by a carrier separation portion 13. While the sample carrier 8 is stopped, a barcode label or radio-frequency identification (RFID) attached to the sample container 7 is read by a reading unit 14, and information regarding the sample is acquired. After the information regarding the sample is acquired, the sample carrier 8 is released from the carrier separation portion 13 and is conveyed one by one to the conveyance path 23. The sample carrier 8 on the conveyance path 23 is conveyed by the rotation of the claws 22, reaches the sample collecting position 10, and is further conveyed to be conveyed out through the sample conveying-out path 12.

The sample container gripping apparatus 20 is an apparatus that grips the sample container 7 conveyed to the sample collecting position 10, and grips the sample container 7 to fix a position of the sample container 7 and prevent falling of the sample container 7. The sample container gripping apparatus 20 is kept outside of the conveyance path 23 until the sample carrier 8 is conveyed to the sample collecting position 10, and when the sample carrier 8 is conveyed to the sample collecting position 10, the sample container gripping apparatus 20 moves horizontally toward the conveyance path 23 so as to grip the sample container 7 from a horizontal direction at the sample collecting position 10. The sample container gripping apparatus 20 is kept outside of the conveyance path 23 until the sample carrier 8 is conveyed to the sample collecting position 10, and moves horizontally toward the sample container 7 after the sample carrier 8 is conveyed to the sample collecting position 10. Therefore, it is possible to prevent foreign matter from being mixed into the sample container 7. In addition, since the sample container gripping apparatus 20 is kept outside of the conveyance path 23 until the sample carrier 8 is conveyed to the sample collecting position 10, the conveyance of the sample container 7 is not hindered. Further, since the sample container gripping apparatus 20 does not move in a vertical direction but moves only in the horizontal direction, downsizing in the top-bottom direction can be achieved.

Figure 4:
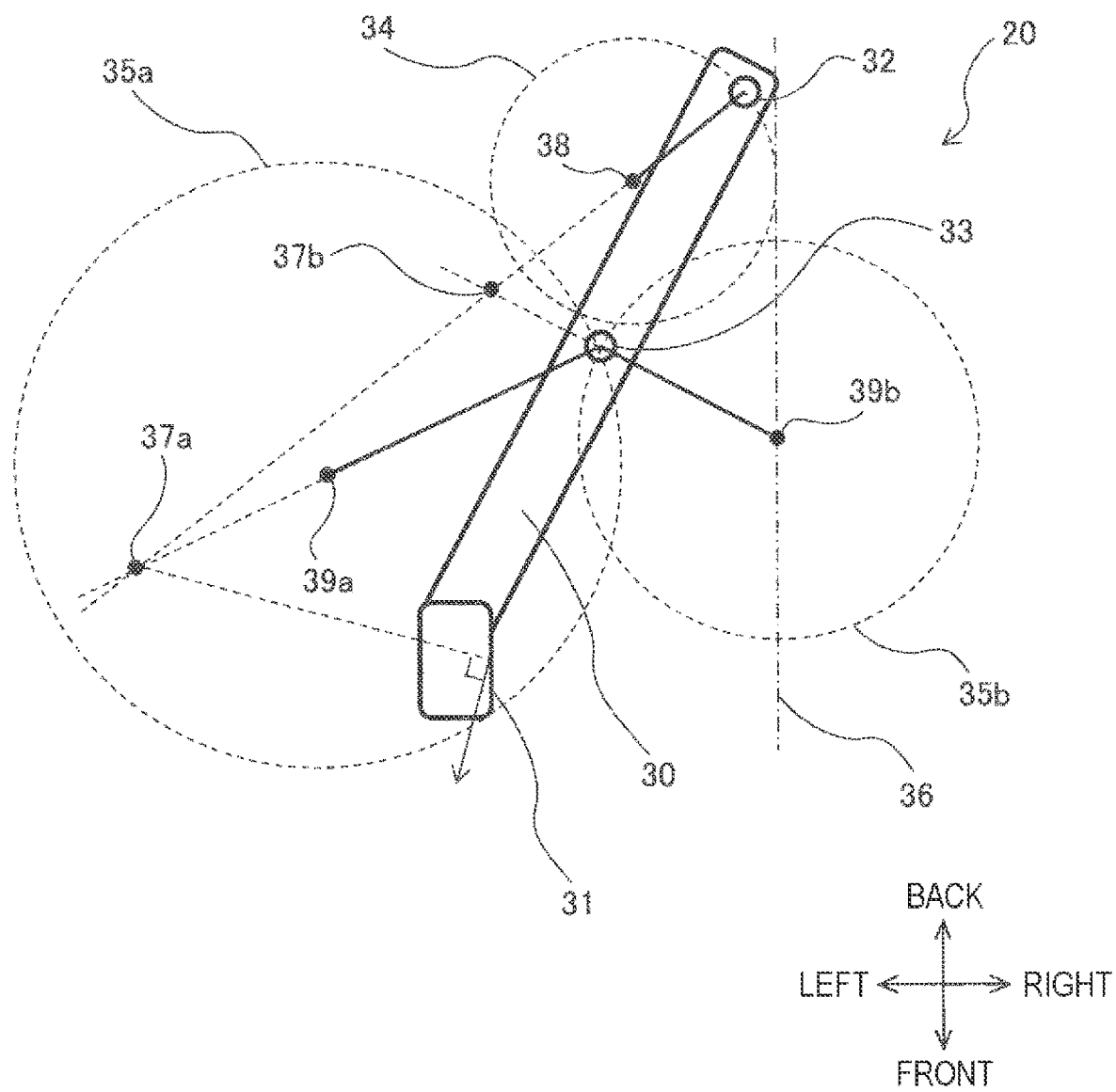
FIG. 4 is a top view illustrating a main part of a sample container gripping apparatus.

A main part of the sample container gripping apparatus 20 will be described with reference to FIG. 4. The sample container gripping apparatus 20 includes a pair of clamps 30 arranged bilaterally symmetrically. Note that only the left one of the pair of clamps 30 is illustrated in FIG. 4, and the right clamp 30 that is arranged symmetric with respect to a symmetry axis 36 is omitted. The symmetry axis 36 is preferably a line connecting the center of the carousel 21 and the sample collecting position 10. The clamp 30 includes a contact surface 31, a first pin 32, and a second pin 33.

The contact surface 31 is a surface that comes into contact with the sample container 7, and is provided at one end of the clamp 30. The sample container 7 is gripped by the contact surfaces 31 coming into contact with the sample container 7 from the left and right. Since the sample container 7 is gripped by the contact surfaces 31 provided bilaterally symmetrically, the sample container 7 is stably and accurately gripped.

The first pin 32 is a shaft driven so as to draw an arc in a horizontal plane, and is provided at the other end of the clamp 30. Note that the arc drawn by the first pin 32 is referred to as a first arc 34, and the center of the first arc 34 is referred to as a first center 38. Directions in which the first pins 32 on the left and right sides are driven are reverse to each other, and in a case where the first pin 32 on the left side is driven in a clockwise direction, the first pin 32 on the right side is driven in a counterclockwise direction.

The second pin 33 is a shaft that moves so as to draw an arc in a horizontal plane while the first pin 32 is driven, and is provided between both ends of the clamp 30. Note that the arc drawn by the second pin 33 is referred to as a second arc 35, and the center of the second arc 35 is referred to as a second center 39. Similarly to the first pin 32, directions in which the second pins 33 on the left and right sides move are reverse to each other.

The second center 39 may be positioned outside the pair of clamps 30 or positioned on the symmetry axis 36. In order to distinguish between the two positions of the second center 39, the second center 39 positioned outside the pair of clamps 30 is referred to as a second center 39a, and the second center 39 positioned on the symmetry axis 36 is referred to as a second center 39b. The second arc 35 with respect to the second center 39a is referred to as a second arc 35a, and the second arc 35 with respect to the second center 39b is referred to as a second arc 35b. The second center 39b and the second arc 35b are shared on the left and right sides.

In the sample container gripping apparatus 20 having the main part described above, a direction in which the first pin 32 is driven is a tangential direction of the first arc 34, and a direction in which the second pin 33 moves is a tangential direction of the second arc 35. Therefore, a direction in which each point on the clamp 30 moves is a tangential direction of an arc centered on an intersection point 37 between a straight line connecting the first pin 32 and the first center 38 and a straight line connecting the second pin 33 and the second center 39. In FIG. 4, as an example of a direction in which the contact surface 31 of the clamp 30 moves, a tangential direction of an arc centered on an intersection point 37a between the straight line connecting the first pin 32 and the first center 38 and a straight line connecting the second pin 33 and the second center 39a is indicated by an arrow. In a case where the second center 39 is positioned on the symmetry axis 36, a tangential direction of an arc centered on an intersection point 37b between the straight line connecting the first pin 32 and the first center 38 and a straight line connecting the second pin 33 and the second center 39b is a moving direction of a point on the clamp 30.

Figure 5:
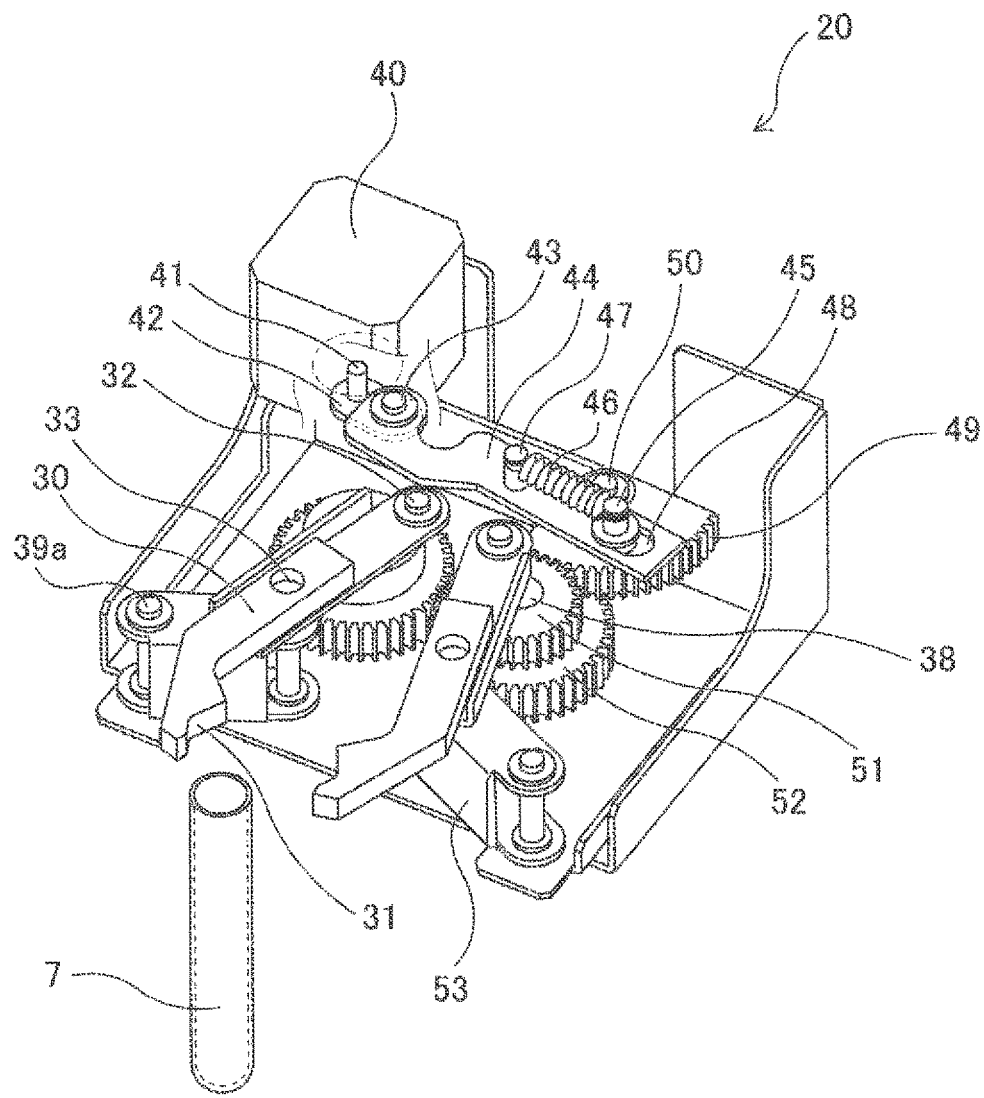
FIG. 5 is a perspective view illustrating a configuration of the sample container gripping apparatus of Embodiment 1.
Figure 5:
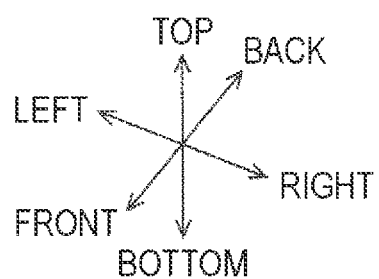
Figure 6:
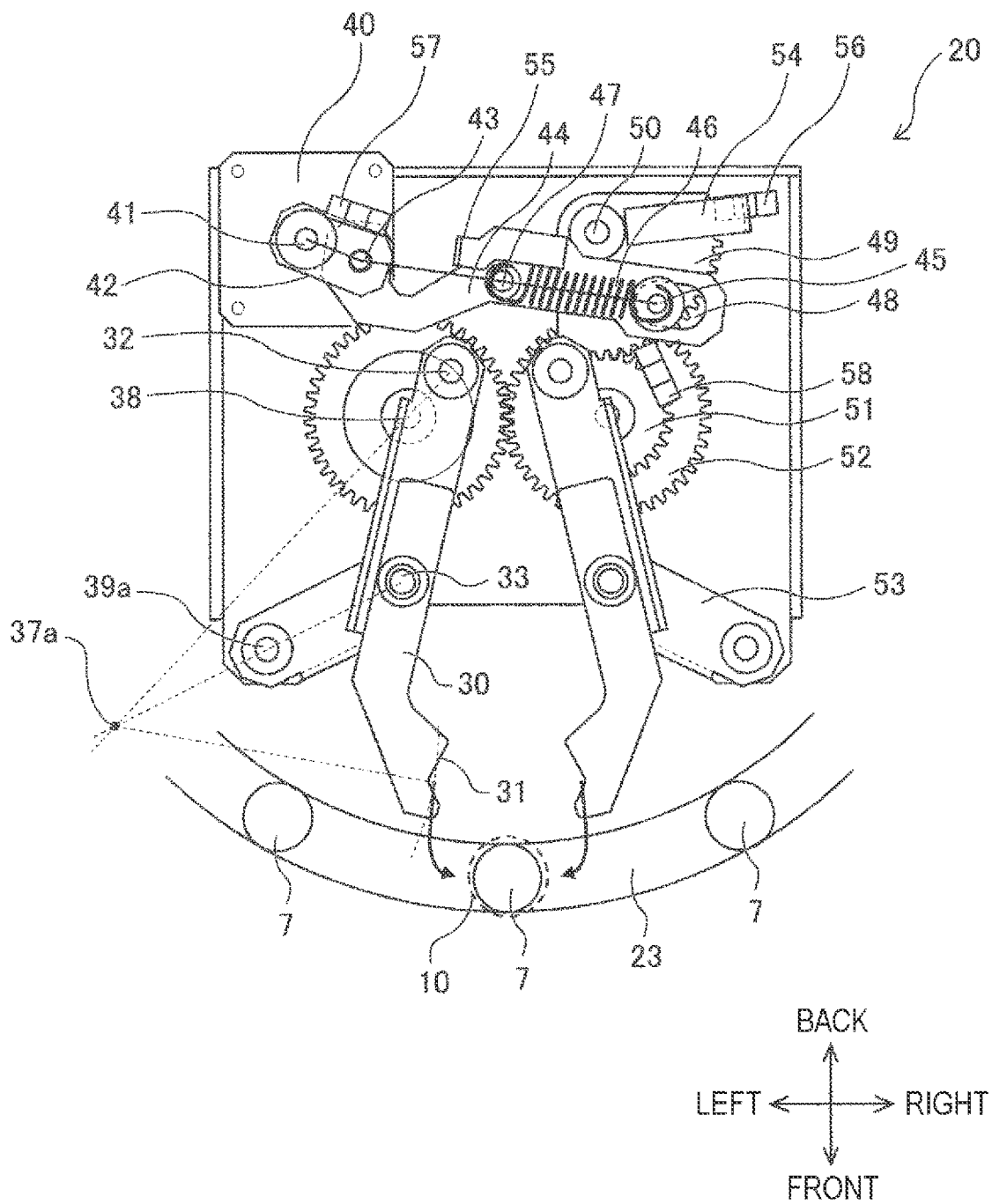
FIG. 6 is a top view illustrating the configuration of the sample container gripping apparatus of Embodiment 1.

A more specific configuration of the sample container gripping apparatus 20 will be described with reference to FIGS. 5 and 6. The sample container gripping apparatus 20 of the present embodiment includes a transmission portion that transmits a rotational driving force generated by a motor 40 to the first pin 32, and the transmission portion includes a crank arm 42, a coupling plate 44, a first gear 49, a second gear 51, a third gear 52, and the like. Hereinafter, an example of the transmission portion will be described.

The motor 40 is, for example, a stepping motor, and includes a rotation shaft 41 that rotates around the top-bottom direction. Note that, when the motor 40 rotates forward, the rotation shaft 41 rotates clockwise. Since one end of the crank arm 42 is fixedly connected to the rotation shaft 41, the crank arm 42 rotates integrally with the rotation shaft 41. A coupling shaft 43 rotatably connected to one end of the coupling plate 44 is provided at the other end of the crank arm 42, and an elongated hole 48 extending toward the coupling shaft 43 is drilled at the other end of the coupling plate 44. A transmission shaft 45 connected to the first gear 49, which is a fan-shaped gear having a central angle of about 90°, passes through the elongated hole 48. Since the transmission shaft 45 is movable along the elongated hole 48, when the rotation shaft 41 rotates clockwise, the transmission shaft 45 is pulled to the left, and the first gear 49 rotates clockwise around a first gear shaft 50 as a rotation center.

Note that the transmission shaft 45 is connected to one end of a spring 46, which is a pulling spring, and the other end of the spring 46 is supported on the coupling plate 44 by a spring fixing portion 47. The transmission shaft 45 pulled toward the spring fixing portion 47 by the spring 46 maintains a state of being in contact with a surface of the elongated hole 48 that is adjacent to the coupling shaft 43.

Since the second gear 51 meshes with the first gear 49, when the first gear 49 rotates clockwise, the second gear 51 rotates counterclockwise. Since the second gear 51 shares the first center 38 as a rotation axis with the right one of a pair of right and left third gears 52, when the second gear 51 rotates counterclockwise, the right third gear 52 also rotates counterclockwise. Since the pair of left and right third gears 52 have the same number of teeth and mesh with each other, when the right third gear 52 rotates counterclockwise, the left third gear 52 rotates clockwise. The pair of left and right third gears 52 are respectively provided with the first pins 32 of the clamps 30 arranged bilaterally symmetrically, and thus, the first pins 32 are driven bilaterally symmetrically on the first arcs 34 by the rotation of the third gears 52.

Further, the second pins 33 of the clamps 30 arranged bilaterally symmetrically are rotatably connected to one ends of a pair of left and right link arms 53, respectively, and the second centers 39a axially supported to be rotatable are provided at the other ends of the link arms 53 bilaterally symmetrically. That is, the second pin 33 moves on the second arc 35a by the link arm 53.

Since the second pin 33 moves on the second arc 35a as the first pin 32 is driven on the first arc 34, the contact surface 31 moves in the tangential direction of the arc centered on the intersection point 37a. The intersection point 37a is a point at which the straight line connecting the first pin 32 and the first center 38 intersects with the straight line connecting the second pin 33 and the second center 39a, and since a position thereof is changed with the movement of the first pin 32 and the second pin 33, the contact surface 31 moves while drawing a curved line as indicated by an arrow in FIG. 6.

Note that, in order to detect a rotation angle of the first gear 49, a first detection plate 54 and a first sensor 56 may be provided. The first detection plate 54 is fixed to the first gear 49 and rotates together with the first gear 49. The first sensor 56 is arranged at a position where the first detection plate 54 is detected when the rotation shaft 41, the coupling shaft 43, the spring fixing portion 47, and the transmission shaft 45 are arranged in this order in a substantially straight line, which corresponds to an origin position of the sample container gripping apparatus 20.

In order to detect a position of the coupling plate 44, a second detection plate 55 and a second sensor 57 may be provided. The second detection plate 55 is fixed to the coupling plate 44 and moves together with the coupling plate 44. The second sensor 57 is arranged at a position where the second detection plate 55 is detected when the coupling shaft 43, the rotation shaft 41, the spring fixing portion 47, and the transmission shaft 45 are arranged in this order in a substantially straight line.

Further, a third sensor 58 may be arranged at a position where the first detection plate 54 is detected when the first gear 49 has rotated by a prescribed rotation angle. Note that the first sensor 56, the second sensor 57, and the third sensor 58 are each fixed to the sample container gripping apparatus 20 by a support member (not illustrated).

Figure 7:
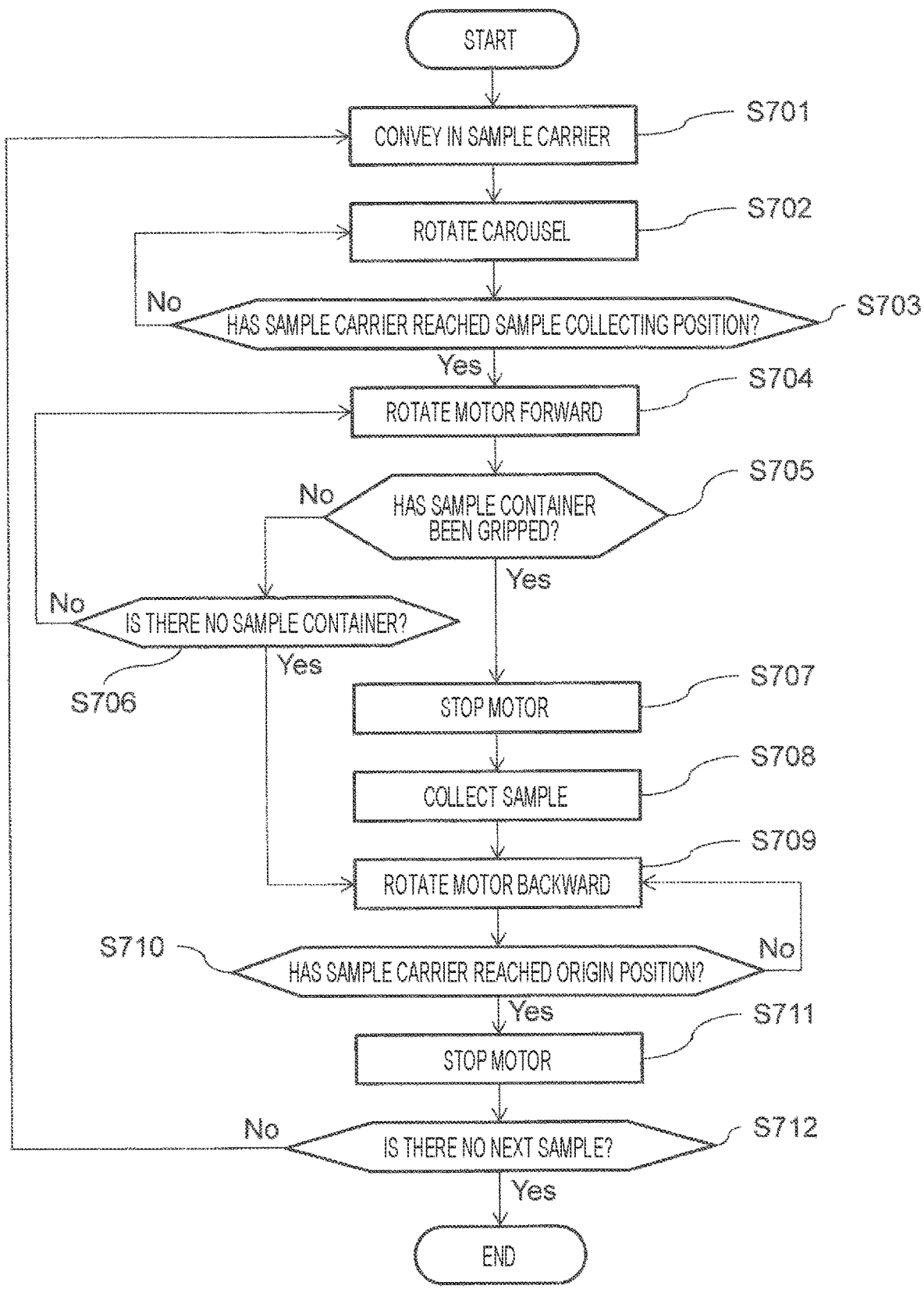
FIG. 7 is a diagram illustrating a flow of an operation of the sample container gripping apparatus of Embodiment 1.

An example of a flow of an operation of the sample container gripping apparatus 20 of the present embodiment will be described with reference to FIG. 7.

(S701)

The connection apparatus 5 conveys in the sample carrier 8 on the basis of an instruction from the control apparatus 9. It is preferable that information regarding the sample is acquired by the reading unit 14 while the sample carrier 8 is stopped by the carrier separation portion 13. It is preferable that the control apparatus 9 moves the sample container gripping apparatus 20 to the origin position on the basis of an output of the first sensor 56.

(S702)

The carousel 21 rotates the claws 22 in a circumferential direction of the conveyance path 23 on the basis of an instruction from the control apparatus 9. The sample carrier 8 held between the claws 22 is conveyed along the conveyance path 23.

(S703)

The control apparatus 9 determines whether or not the sample carrier 8 has reached the sample collecting position 10. In a case where the sample carrier 8 has not reached the sample collecting position 10, the processing returns to S702, and in a case where the sample carrier 8 has reached the sample collecting position 10, the processing proceeds to S704.

(S704)

The control apparatus 9 rotates the motor 40 forward in a state in which the carousel 21 is stopped. Note that a height of the sample carrier 8 may be adjusted by a lifting apparatus (not illustrated) according to a height of the analysis apparatus 6.

(S705)

The control apparatus 9 determines whether or not the sample container gripping apparatus 20 has gripped the sample container 7. In a case where the sample container gripping apparatus 20 has not gripped the sample container 7, the processing proceeds to S706, and in a case where the sample container gripping apparatus 20 has gripped the sample container 7, the processing proceeds to S707.

Figure 8:
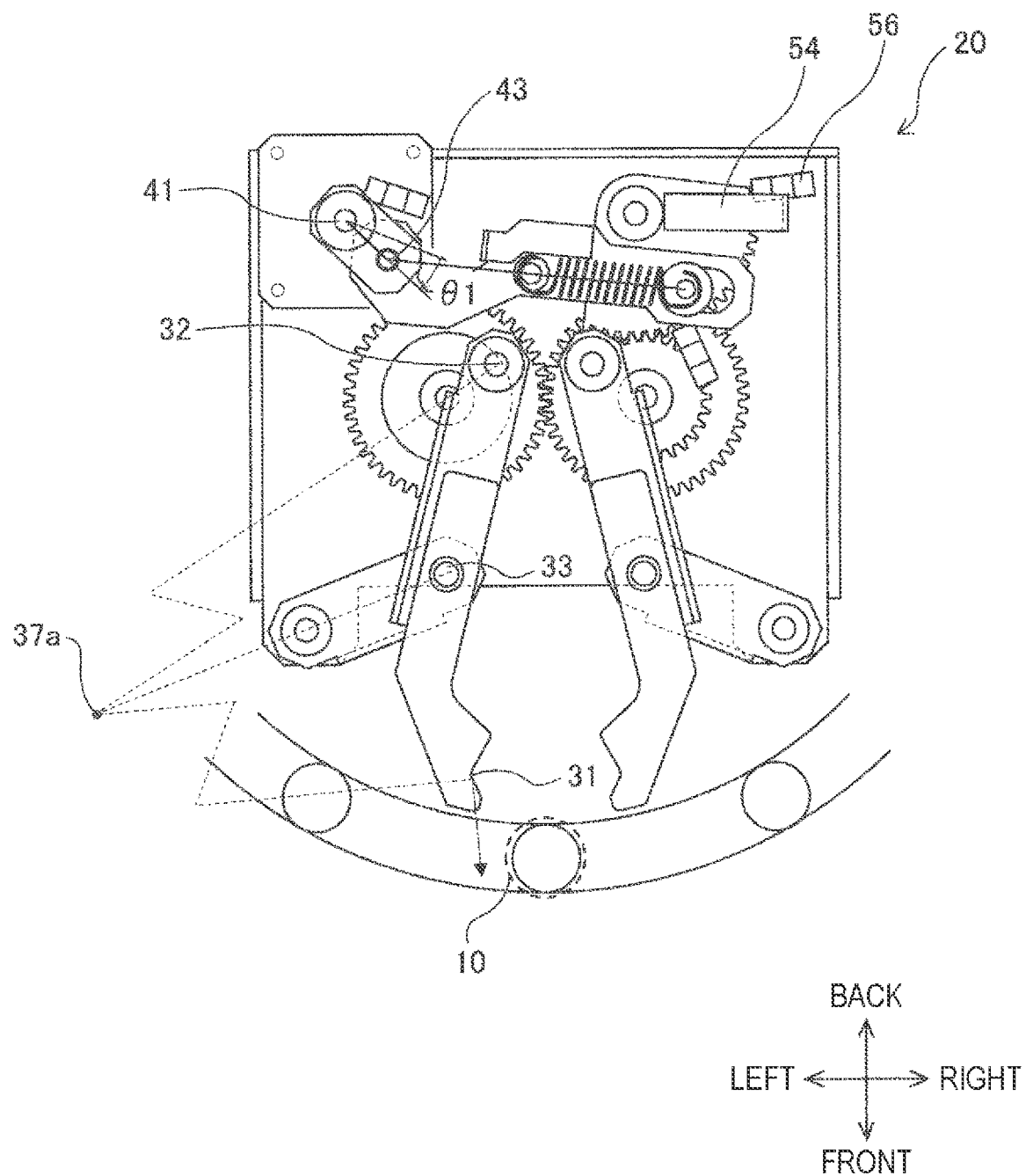
FIG. 8 is a top view illustrating the operation of the sample container gripping apparatus of Embodiment 1.

An operation until the sample container gripping apparatus 20 grips the sample container 7 will be described with reference to FIGS. 8 to 11. FIG. 8 illustrates a state in which the coupling shaft 43 has rotated from the origin position by an angle θ1 as the rotation shaft 41 rotates clockwise. As the coupling shaft 43 rotates, the first pin 32 and the second pin 33 move and the intersection point 37*a* also moves. Therefore, a moving direction of the contact surface 31 is a direction indicated by an arrow in FIG. 8. Note that, since the first detection plate 54 is detached from the first sensor 56 in FIG. 8, the movement of the sample container gripping apparatus 20 to the origin position in S701 may be executed by rotating the rotation shaft 41 counterclockwise in the state illustrated in FIG. 8.

Figure 9:
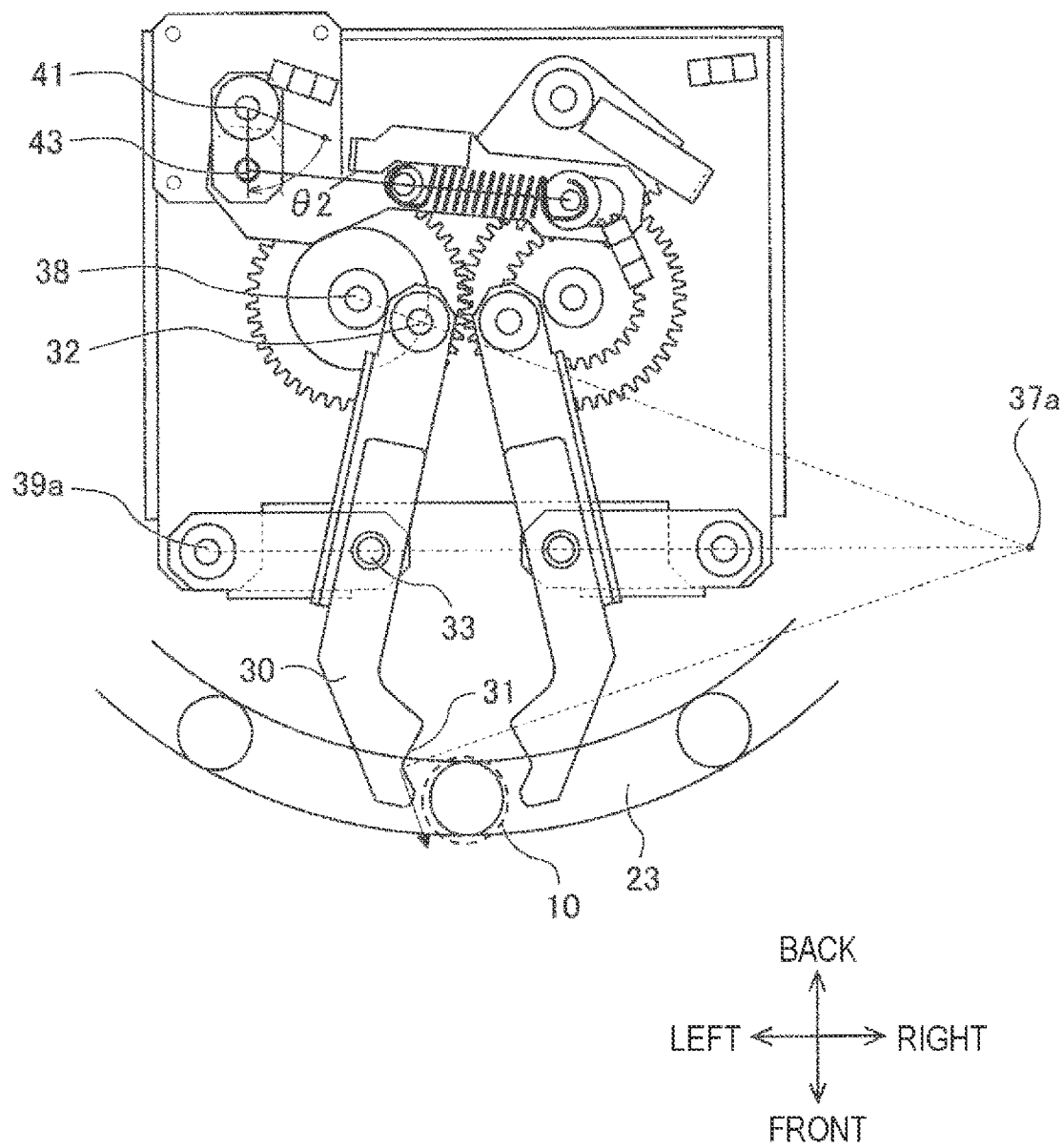
FIG. 9 is a top view illustrating the operation of the sample container gripping apparatus of Embodiment 1.

FIG. 9 illustrates a state in which the coupling shaft 43 rotates from the origin position by an angle θ2 (>θ1) as the rotation shaft 41 further rotates clockwise. As the first pin 32 and the second pin 33 move, the intersection point 37*a* between the straight line connecting the first pin 32 and the first center 38 and the straight line connecting the second pin 33 and the second center 39 moves to a position illustrated in FIG. 9. Therefore, the moving direction of the contact surface 31 is a direction indicated by an arrow in FIG. 9. The clamp 30 intersects with the conveyance path 23.

Figure 10:
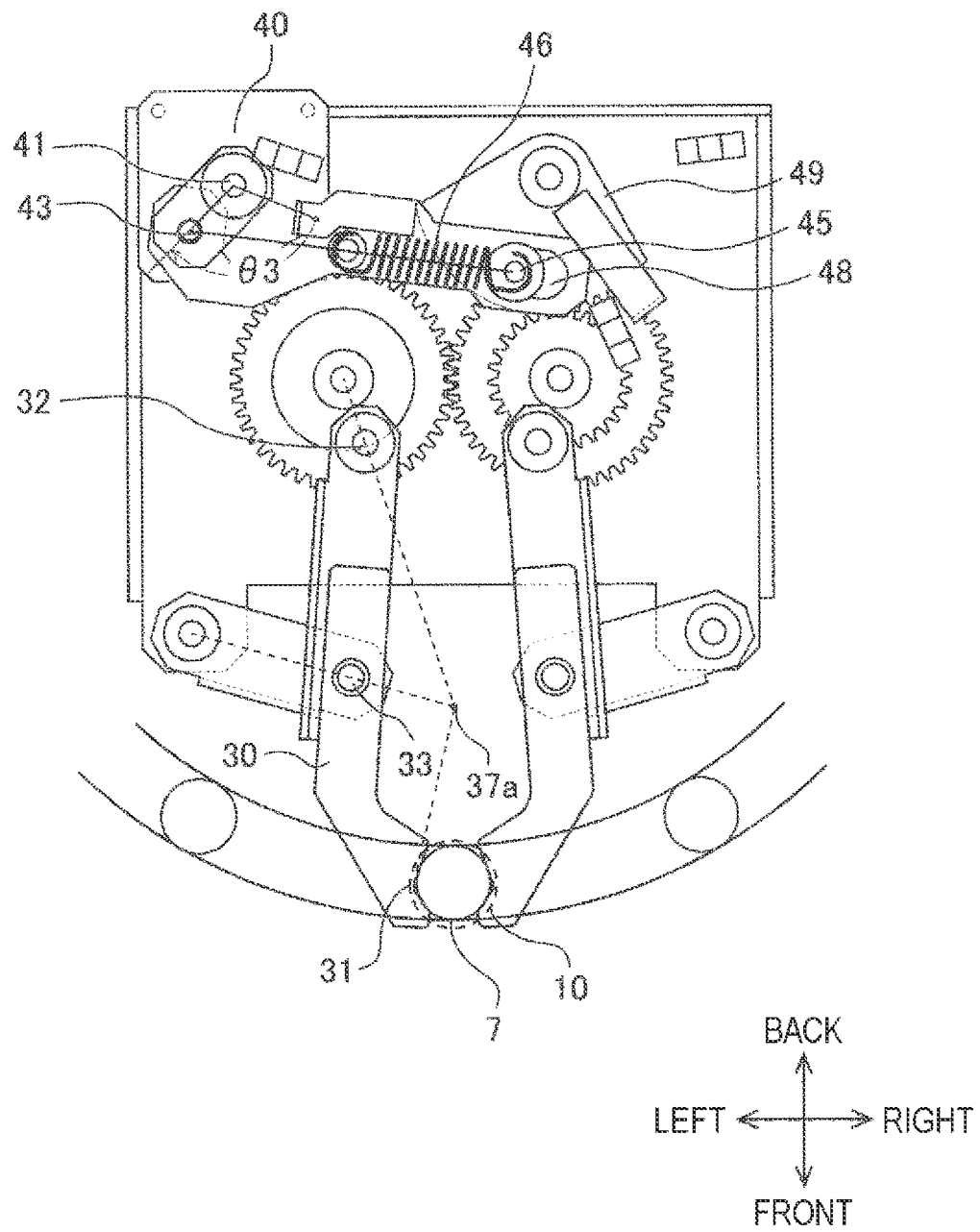
FIG. 10 is a top view illustrating the operation of the sample container gripping apparatus of Embodiment 1.

FIG. 10 illustrates a state in which the coupling shaft 43 rotates from the origin position by an angle θ3 (>θ2) as the rotation shaft 41 further rotates clockwise. As the first pin 32 and the second pin 33 move, the intersection point 37*a* moves, and the contact surface 31 comes into contact with the sample container 7 arranged at the sample collecting position 10. Note that, in a process from the origin position to a state illustrated in FIG. 10, the spring 46 only pulls the transmission shaft 45 in the elongated hole 48, and an elastic force of the spring 46 is not transmitted from the transmission shaft 45 to the first gear 49. Therefore, since loads required for the movement of the clamp 30 are only an inertial force due to acceleration and a frictional load, power consumption of the motor 40 until the contact surface 31 moves from the origin position and comes into contact with the sample container 7 can be reduced. In addition, since the clamp 30 is driven by one motor 40, the sample container gripping apparatus 20 can be implemented at low cost. Note that, in the state illustrated in FIG. 10, the contact surface 31 is merely in contact with the sample container 7, and no force for gripping the sample container 7 is generated in the clamp 30.

Figure 11:
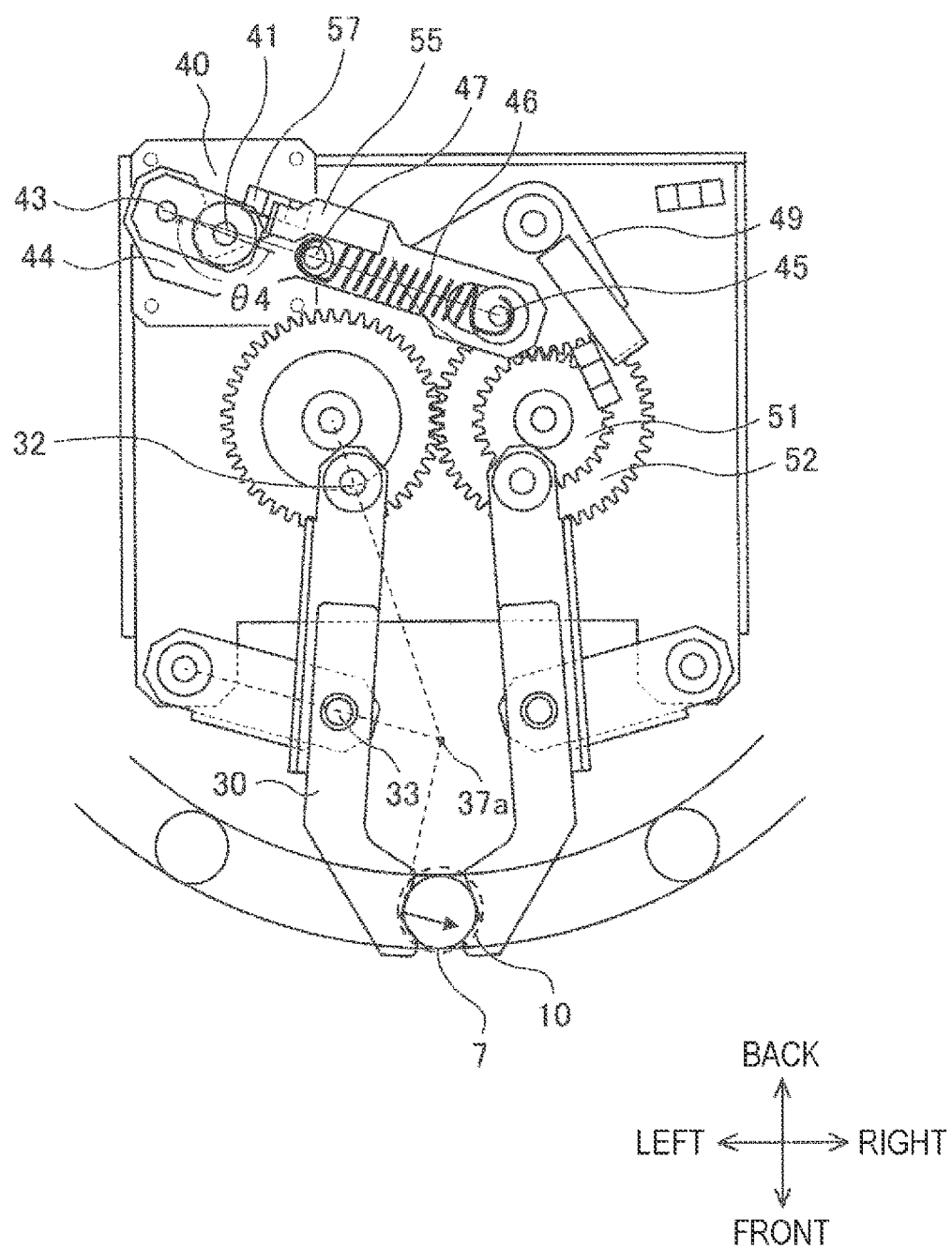
FIG. 11 is a top view illustrating the operation of the sample container gripping apparatus of Embodiment 1.

FIG. 11 illustrates a state in which as the rotation shaft 41 further rotates clockwise, the coupling shaft 43 rotates by an angle θ4 (>θ3) from the origin position to move toward a side opposite to a side on which the transmission shaft 45 is present with respect to the rotation shaft 41. Since the clamp 30 is in contact with the sample container 7, the rotation angles of the third gear 52, the second gear 51, and the first gear 49 and a position of the transmission shaft 45 are fixed as the positions of the first pin 32 and the second pin 33 are fixed. While the position of the transmission shaft 45 is fixed, the spring fixing portion 47 moves so as to approach the rotation shaft 41 together with the coupling plate 44. Therefore, the spring 46 is stretched to generate a torque that causes the first gear 49 to rotate clockwise via the transmission shaft 45. The torque acts on the clamp 30 via the second gear 51 and the third gear 52, and serves as a force for gripping the sample container 7. In the state illustrated in FIG. 11, since a straight line connecting the coupling shaft 43 and the spring fixing portion 47 is positioned behind the center of the rotation shaft 41, the backward rotation of the motor 40 can be prevented by the elastic force of the spring 46.

The second sensor 57 may be arranged at a position where the second detection plate 55 is detected when the straight line connecting the coupling shaft 43 and the spring fixing portion 47 is positioned behind the center of the rotation shaft 41. That is, whether or not the sample container gripping apparatus 20 has gripped the sample container 7 may be determined on the basis of the output of the second sensor 57.

Incidentally, there are a plurality of types of sample containers 7 having different diameters. A case of diameters d2 and d3 smaller than a diameter d1 of the sample container 7 illustrated in FIG. 11 and the like will be described with reference to FIGS. 12 and 13. Note that d2=(d1+d3)/2.

Figure 12:
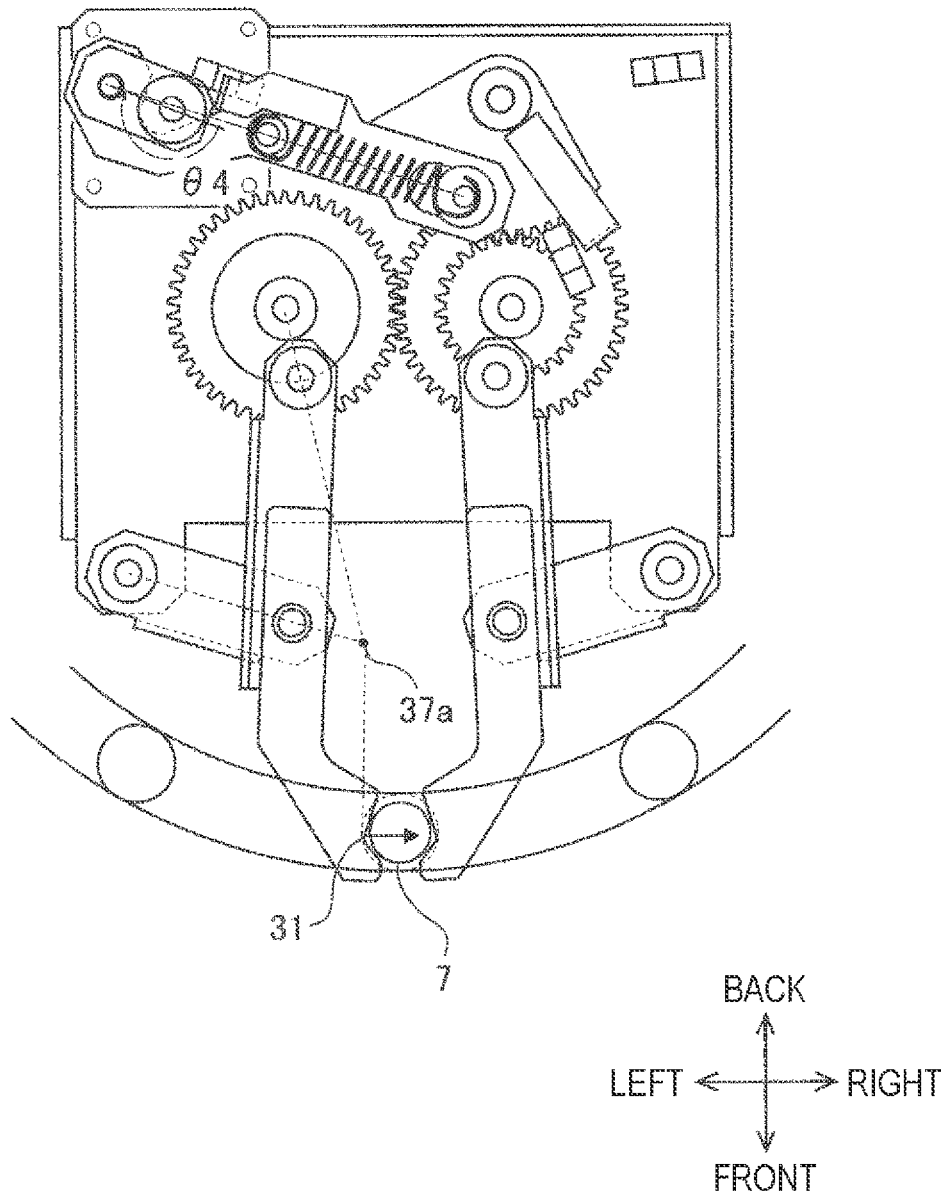
FIG. 12 is a top view illustrating the operation of the sample container gripping apparatus of Embodiment 1.

FIG. 12 illustrates a state in which the sample container 7 having the diameter d2 (<d1) is gripped. In FIG. 12, the contact surface 31 comes into contact with the sample container 7 when the intersection point 37*a* is positioned on a tangent in the front-back direction with respect to the sample container 7. Therefore, only a gripping force from the left-right direction is applied to the sample container 7.

Figure 13:
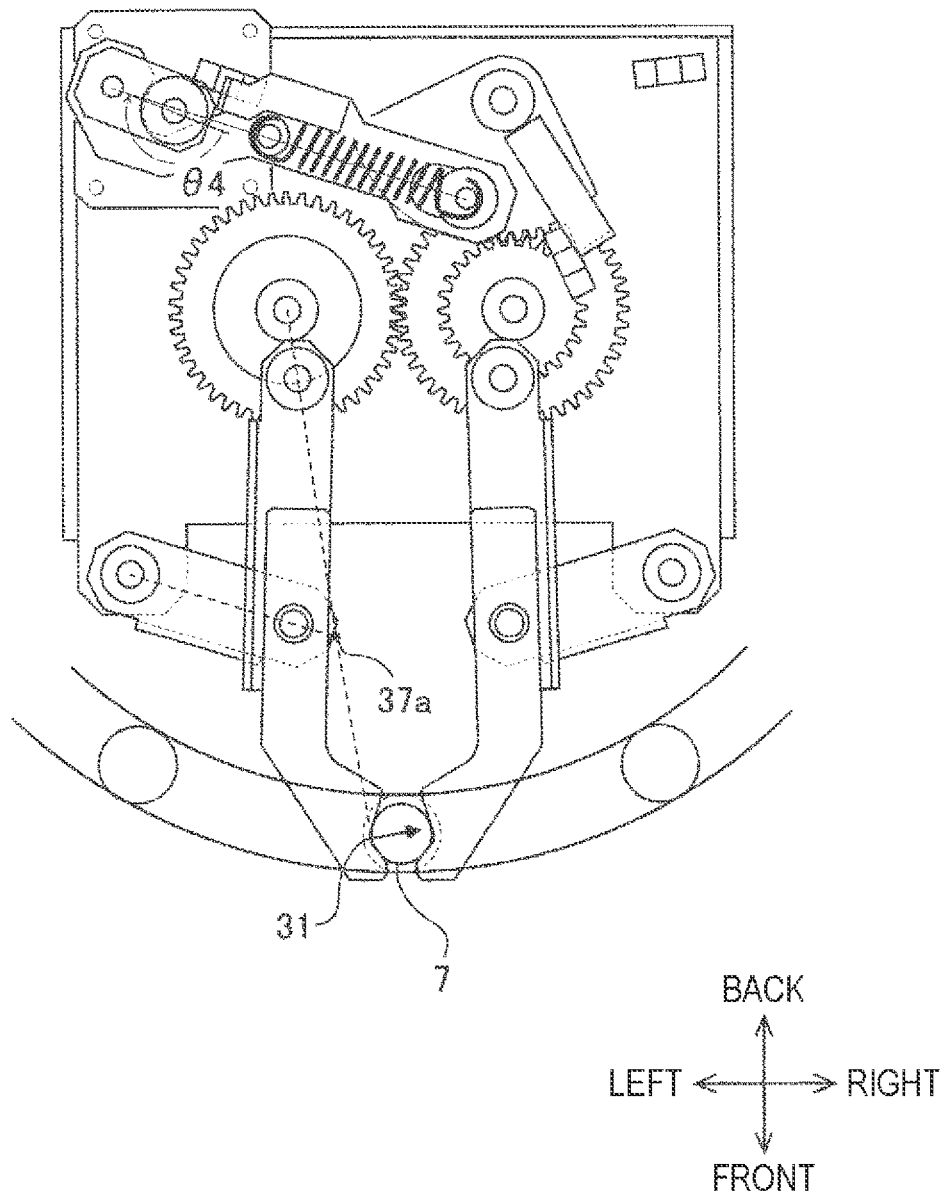
FIG. 13 is a top view illustrating the operation of the sample container gripping apparatus of Embodiment 1.

FIG. 13 illustrates a state in which the sample container 7 having the diameter d3 (<d2) is gripped. In FIG. 13, since the intersection point 37*a* moves more leftward as compared with the case in FIG. 12, the gripping force toward the back right side is applied. Note that, in FIG. 11, since the intersection point 37*a* moves more rightward as compared with the case in FIG. 12, the gripping force toward the front right side is applied. Therefore, a force to move the sample container 7 backward in FIG. 13 and forward in FIG. 11 acts on the sample container 7 by the pair of clamps 30. Therefore, the contact surface 31 preferably has a shape enclosing the sample container 7, for example, a shape having a V-shaped groove.

Figure 14:
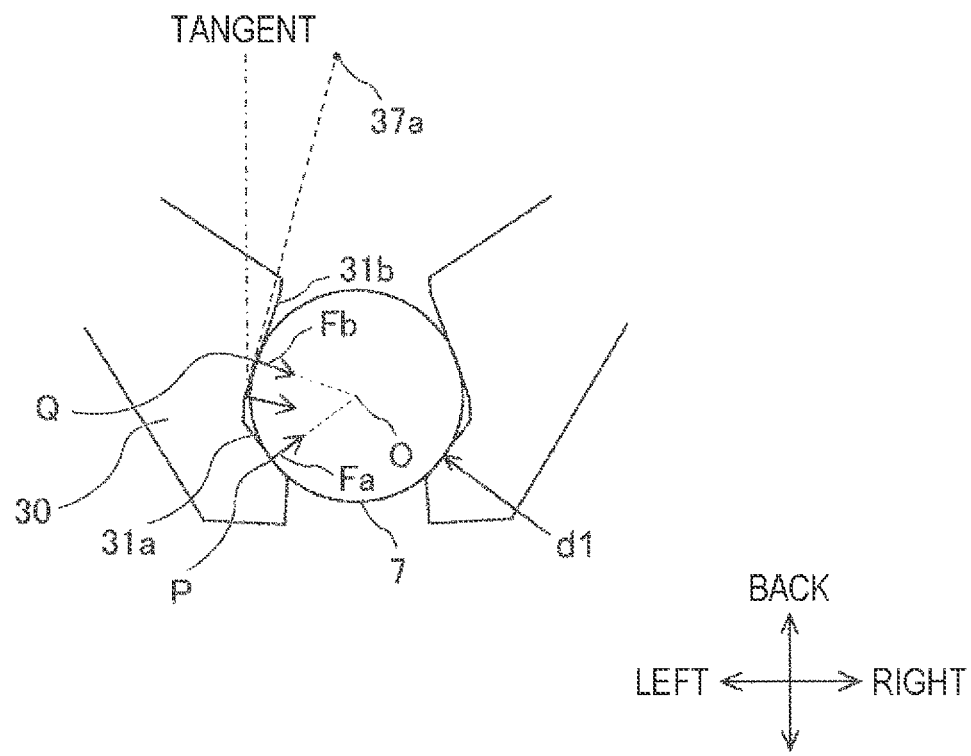
FIG. 14 is an enlarged view illustrating a contact surface of the sample container gripping apparatus of Embodiment 1.
Figure 14:
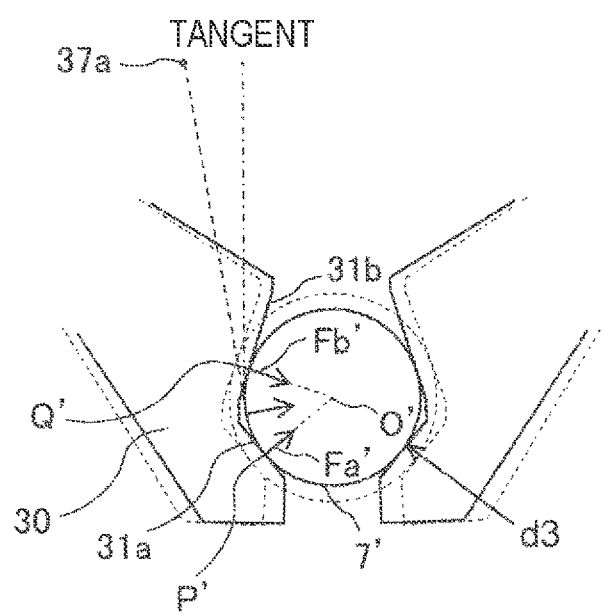

An example of the shape of the contact surface 31 will be described with reference to FIG. 14. Note that FIG. 14(*a*) is an enlarged view of the vicinity of the contact surface 31 in a case of the large diameter d1, and FIG. 14(*b*) is a view in a case of the small diameter d3. In FIG. 14(*b*), the case of the large diameter d1 is indicated by a dotted line. In FIG. 14, the contact surface 31 has a shape having a V-shaped groove, and is divided into a front-side contact surface 31*a* and a back-side contact surface 31*b*.

In FIG. 14(*a*), as in FIG. 11, since the intersection point 37*a* is on the right side of the tangent in the front-back direction, the left clamp 30 moves to the front right side. At this time, the front-side contact surface 31*a* comes into contact with the sample container 7 at a point P, and generates a reaction force Fa toward a central position O of the sample container 7. When the front-side contact surface 31*a* comes into contact with the sample container 7 at the point P, the back-side contact surface 31*b* comes into contact with the sample container 7 at a point Q, and the back-side contact surface 31*b* is arranged so as to generate a reaction force Fb toward the central position O of the sample container 7. By arranging the front-side contact surface 31*a* and the back-side contact surface 31*b* in this manner, the pair of left and right clamps 30 can grip the sample container 7 at the central position O.

In FIG. 14(*b*), as in FIG. 13, since the intersection point 37*a* is on the left side of the tangent in the front-back direction, the left clamp 30 moves to the back right side. At this time, the front-side contact surface 31*a* comes into contact with a sample container 7' at a point P', and generates a reaction force Fa' toward a central position O' of the sample container 7'. When the front-side contact surface 31*a* comes into contact with the sample container 7' at the point P', the back-side contact surface 31*b* comes into contact with the sample container 7' at a point Q', and the back-side contact surface 31*b* is arranged so as to generate a reaction force Fb' toward the central position O' of the sample container 7'. By arranging the front-side contact surface 31*a* and the back-side contact surface 31*b* in this manner, the pair of left and right clamps 30 can grip the sample container 7 at the central position O.

Here, relative positions and angles of the front-side contact surface 31*a* and the back-side contact surface 31*b* are preferably set in such a manner that a distance from the point P to the point P' and a distance from the point Q to the point Q' are equal to (d1−d3)/2. With such an arrangement, a plurality of types of sample containers 7 having different diameters can be accurately gripped. Note that the central position O of the sample container 7 and the central position O' of the sample container 7' do not have to be the same positions, and may have an error of, for example, about 0.2 mm.

In addition, it is preferable that the position of the intersection point 37*a* when the sample container 7 having the diameter d2 is gripped is arranged in a range sandwiched by tangents extending backward from respective side surfaces of the sample containers 7 having different diameters. Specifically, it is preferable that the intersection point 37*a* when the sample container 7 having the diameter d2 is gripped is arranged between a tangent extending backward from the side surface of the sample container 7 having the diameter d1 and a tangent extending backward from the side surface of the sample container 7 having the diameter d3. With such an arrangement, the sample container 7 having a diameter in a range of d1 to d3 can be accurately gripped.
(S706)

The control apparatus 9 determines whether or not it has been detected that there is no sample container 7 on the sample carrier 8 conveyed to the sample collecting position 10. In a case where it has not been detected that there is no sample container 7, the processing returns to S704, and in a case where it has been detected that there is no sample container 7, the processing proceeds to S709.

Figure 15:
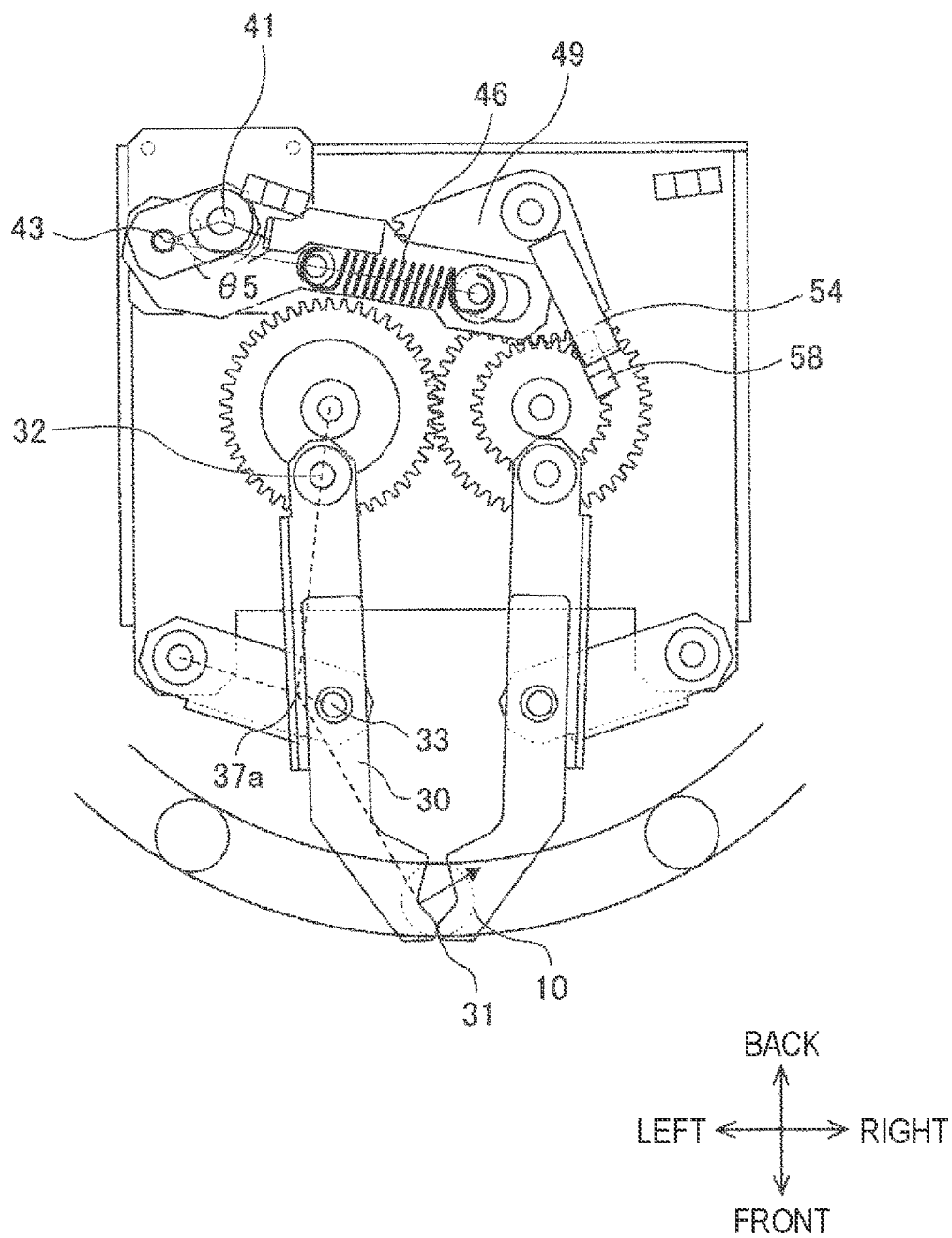
FIG. 15 is a top view illustrating the operation of the sample container gripping apparatus of Embodiment 1.

A case where there is no sample container 7 will be described with reference to FIG. 15. FIG. 15 illustrates a state in which the coupling shaft 43 rotates from the origin position by an angle θ5 (>θ3) as the rotation shaft 41 further rotates clockwise in the state illustrated in FIG. 10 in which the contact surface 31 is in contact with the sample container 7. Note that θ5 is smaller than θ4. As the first pin 32 and the second pin 33 move, the intersection point 37*a* moves, and the contact surfaces 31 come into contact with each other. Since the contact surface 31 is not in contact with the sample container 7, the first gear 49 further rotates in the state illustrated in FIG. 10, the first detection plate 54 moves to the position of the third sensor 58 with the rotation of the first gear 49, and an output of the third sensor 58 is changed. That is, it may be detected that there is no sample container 7 at the sample collecting position 10 on the basis of the output of the third sensor 58.
(S707)

The control apparatus 9 stops the motor 40. The sample container 7 is gripped by the torque acting on the clamp 30 when the spring 46 is stretched.
(S708)

The analysis apparatus 6 collects the sample from the sample container 7 gripped by the sample container gripping apparatus 20.
(S709)

The control apparatus 9 rotates the motor 40 backward. As the motor 40 rotates backward, the pair of clamps 30 release the gripped sample container 7 and horizontally move toward the origin position.
(S710)

The control apparatus 9 determines whether or not the sample carrier 8 has reached the origin position. In a case where the sample carrier 8 has not reached the origin position, the processing returns to S709, and in a case where the sample carrier 8 has reached the origin position, the processing proceeds to S711. Whether or not the sample carrier 8 has reached the origin position may be determined on the basis of the output of the first sensor 56.
(S711)
The control apparatus 9 stops the motor 40. The pair of clamps 30 return to the origin position. Note that in a case where the height of the sample carrier 8 has been adjusted in S704, the sample carrier 8 returns to the original height in this step.
(S712)
The control apparatus 9 determines whether or not there is a next sample to be analyzed. In a case where there is no next sample, the processing ends, and in a case where there is a next sample, the processing returns to S701.

With the flow of the processing described above, the sample container 7 can be gripped without allowing foreign matter such as abrasion powder generated from the pair of clamps 30 to be mixed into the sample accommodated in the sample container 7 on the conveyance path 23. Note that, since the sample container gripping apparatus 20 of the present embodiment moves in the horizontal direction and grips the sample container 7 from the horizontal direction, it is possible to downsize the sample container 7 in the top-bottom direction. In addition, the pair of clamps 30 are kept outside of the conveyance path 23 until the sample carrier 8 is conveyed to the sample collecting position 10, and thus, do not hinder the conveyance of the sample container 7.

Embodiment 2

In Embodiment 1, a case where the second center 39 is positioned outside the pair of clamps 30, that is, a case of the second center 39a, has been described. In the present embodiment, a case where the second center 39 is positioned on the symmetry axis 36 of the pair of clamps 30, that is, a case of the second center 39b will be described. Note that a description of the same configuration as that of Embodiment 1 will be omitted.

Figure 16:
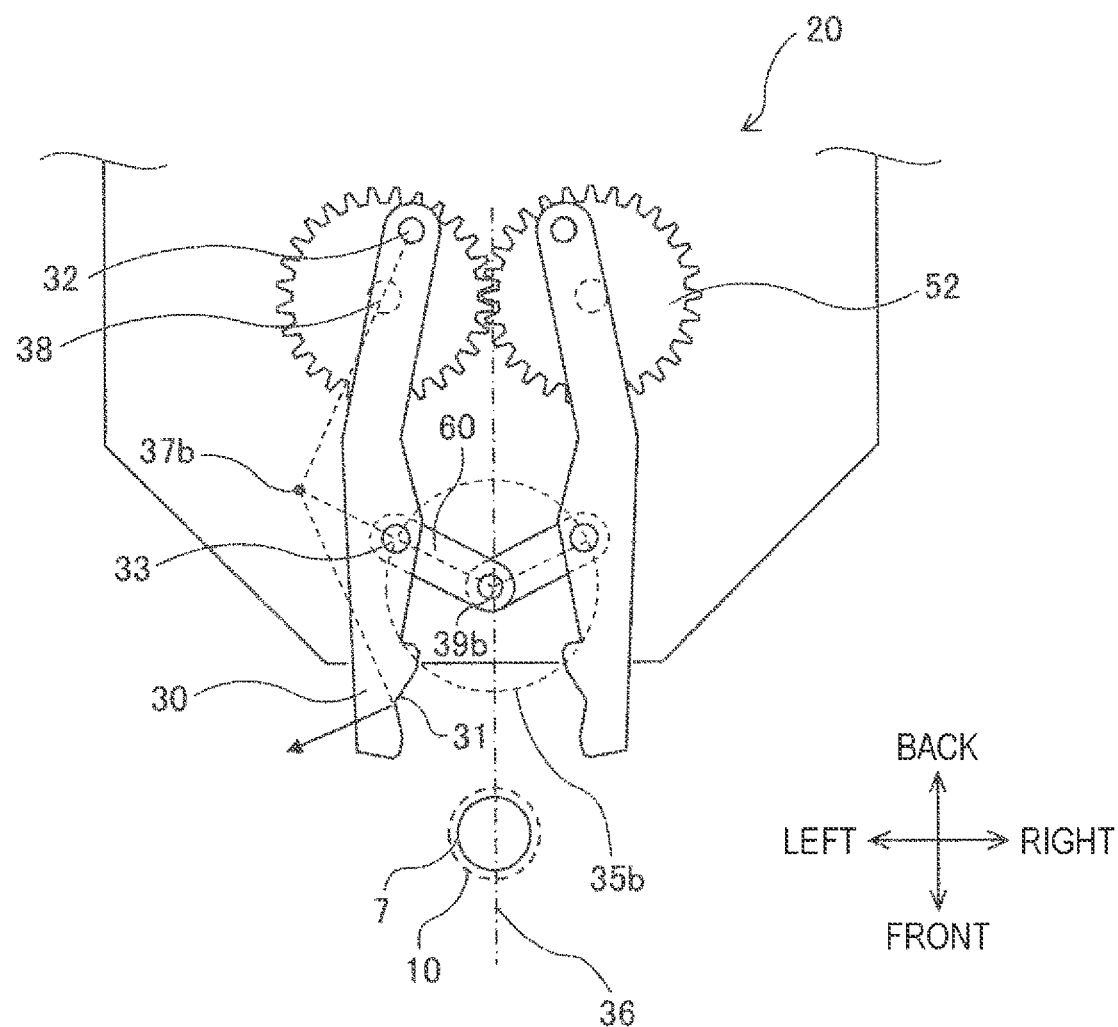
FIG. 16 is a top view illustrating a configuration and an operation of a sample container gripping apparatus of Embodiment 2.

A configuration of a sample container gripping apparatus 20 of the present embodiment and an operation from an origin position to gripping of a sample container 7 will be described with reference to FIGS. 16 to 19. As illustrated in FIG. 16, the sample container gripping apparatus 20 of the present embodiment includes a pair of clamps 30 and a pair of third gears 52 arranged bilaterally symmetrically as in Embodiment 1. Note that a configuration including a motor 40, a second gear 51, and the like is omitted in FIG. 16.

As in Embodiment 1, the clamp 30 includes a contact surface 31, a first pin 32, and a second pin 33. The contact surface 31 is a surface that comes into contact with the sample container 7, and is provided at one end of the clamp 30. The first pin 32 is provided at the other end of the clamp 30 and is rotatably connected to the third gear 52 to be driven so as to draw an arc with a first center 38 as a rotation center. The second pin 33 is provided between both ends of the clamp 30 and is rotatably connected to one end of a second link arm 60. The other end of the second link arm 60 is rotatably connected to a second center 39b arranged on a symmetry axis 36. Note that the second link arms 60 are arranged bilaterally symmetrically with respect to the symmetry axis 36.

With such a configuration, the second pin 33 of the present embodiment moves so as to draw a second arc 35b centered on the second center 39b as the first pin 32 is driven. Then, the contact surface 31 moves in a tangential direction of an arc centered on an intersection point 37b between a straight line connecting the first pin 32 and the first center 38 and a straight line connecting the second pin 33 and the second center 39b. Note that, in FIG. 16, a direction in which the contact surface 31 moves when the left third gear 52 rotates clockwise in a state in which the sample container gripping apparatus 20 is at the origin position is indicated by an arrow.

Figure 17:
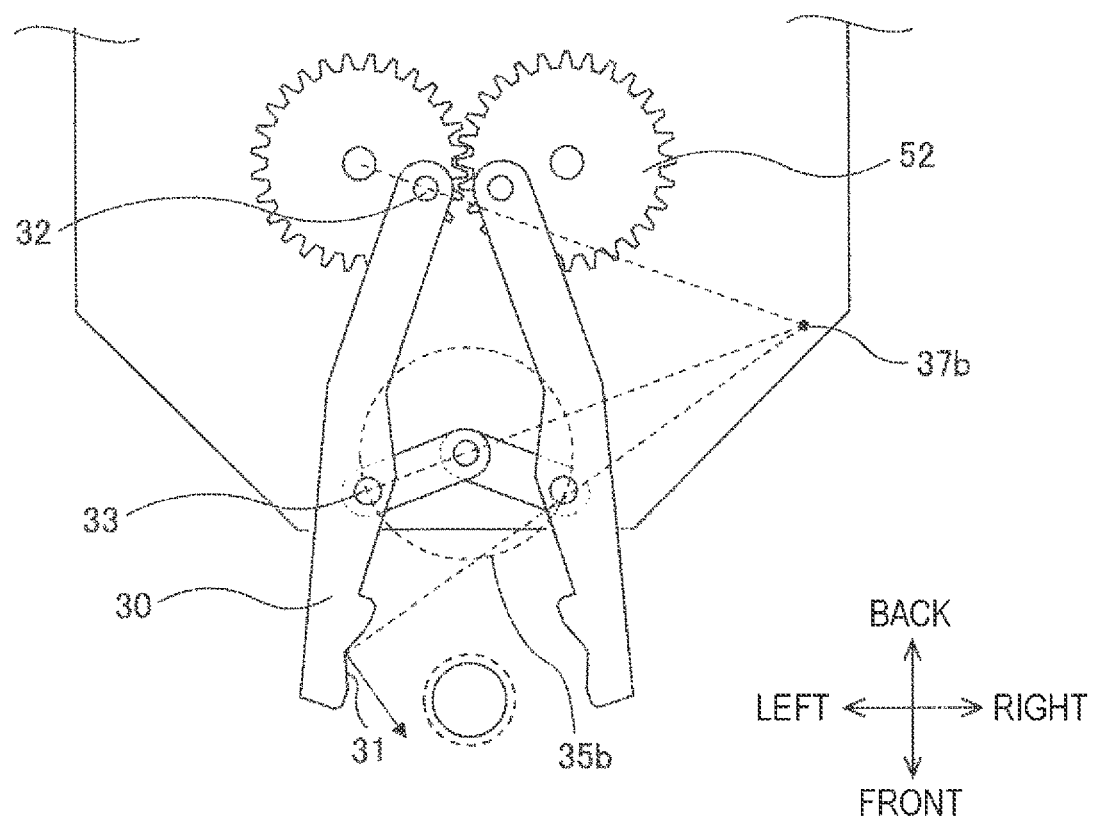
FIG. 17 is a top view illustrating the configuration and the operation of the sample container gripping apparatus of Embodiment 2.

FIG. 17 illustrates a state in which, as the left third gear 52 rotates clockwise from the origin position, the first pin 32 and the second pin 33 move, and the pair of clamps 30 move forward while being opened up. As the first pin 32 and the second pin 33 move, the intersection point 37b moves to a position illustrated in FIG. 17, and a moving direction of the contact surface 31 is indicated by an arrow in FIG. 17.

Figure 18:
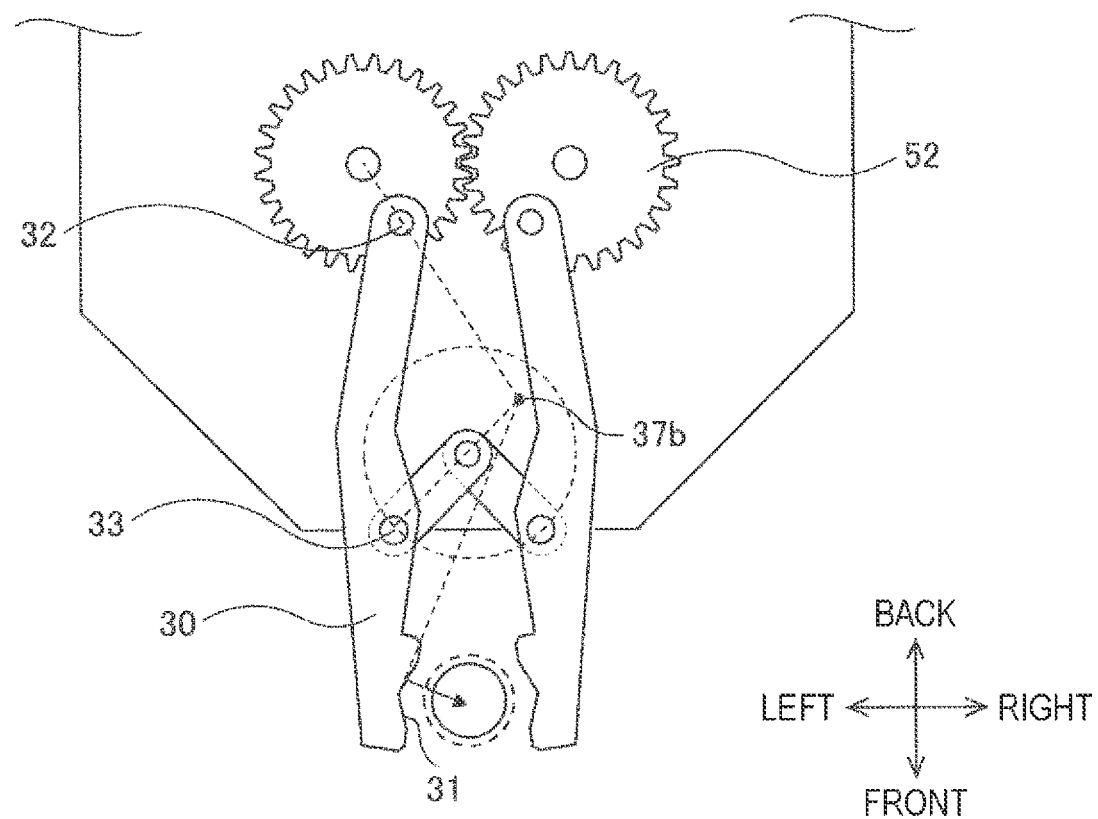
FIG. 18 is a top view illustrating the configuration and the operation of the sample container gripping apparatus of Embodiment 2.

FIG. 18 illustrates a state in which, as the left third gear 52 further rotates clockwise, the first pin 32 and the second pin 33 move, and the pair of clamps 30 move forward while being closed. As the first pin 32 and the second pin 33 move, the intersection point 37b moves to a position illustrated in FIG. 18, and the moving direction of the contact surface 31 is indicated by an arrow in FIG. 18.

Figure 19:
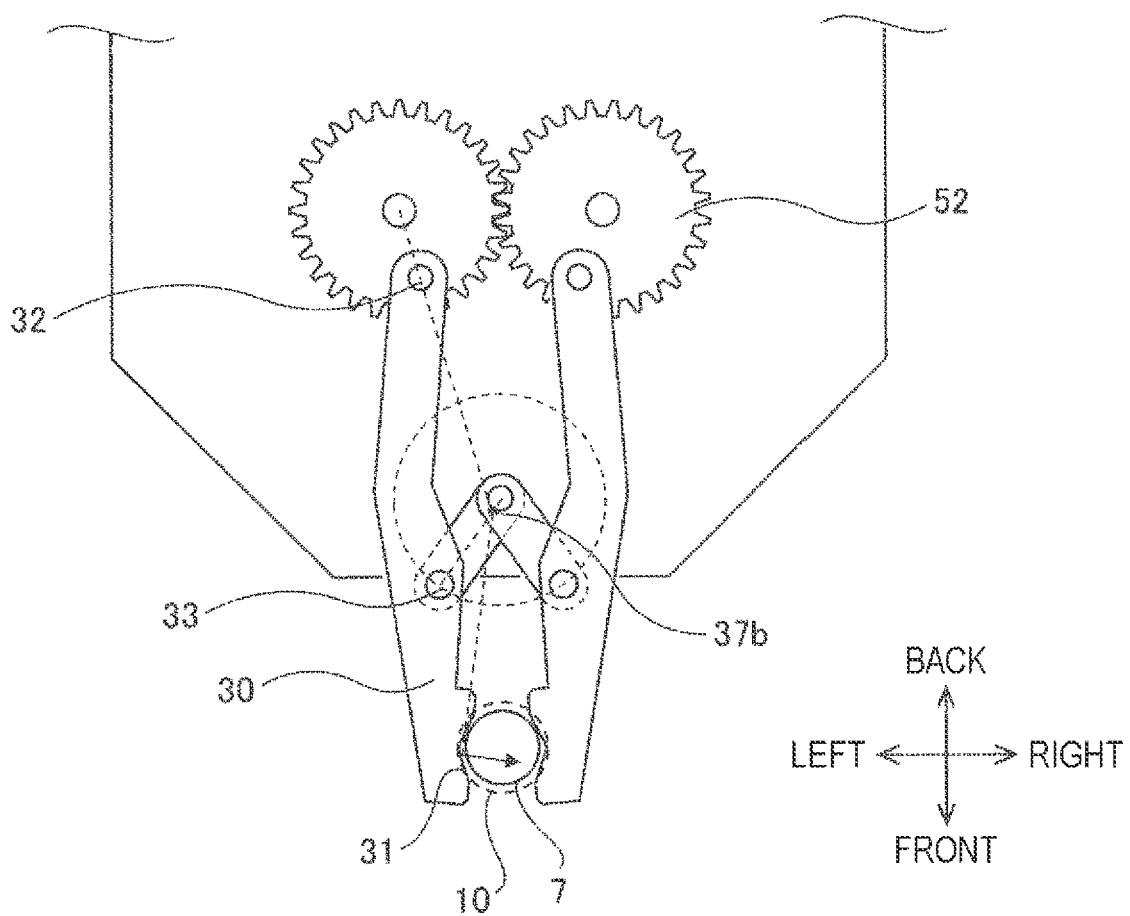
FIG. 19 is a top view illustrating the configuration and the operation of the sample container gripping apparatus of Embodiment 2.

FIG. 19 illustrates a state in which, as the left third gear 52 further rotates clockwise, the first pin 32 and the second pin 33 move, the pair of clamps 30 are further closed, and the contact surface 31 comes into contact with the sample container 7. The intersection point 37b moves to a position illustrated in FIG. 19, and the contact surface 31 moves substantially rightward as indicated by an arrow in FIG. 19. Since the contact surface 31 moves substantially rightward, the sample container 7 conveyed to a sample collecting position 10 is accurately gripped by the pair of bilaterally symmetrical clamps 30.

With the configuration and operation described above, the sample container 7 can be gripped without allowing foreign matter such as abrasion powder generated from the pair of clamps 30 to be mixed into a sample accommodated in the sample container 7, as in Embodiment 1. In addition, since the sample container gripping apparatus 20 of the present embodiment also moves in the horizontal direction and grips the sample container 7 from the horizontal direction, it is possible to downsize the sample container 7 in the top-bottom direction. In addition, the pair of clamps 30 are kept outside of the conveyance path 23 until the sample carrier 8 is conveyed to the sample collecting position 10, and thus, do not hinder the conveyance of the sample container 7.

Embodiment 3

In Embodiment 2, it has been described that the second pin 33 moves on the second arc 35b centered on the second center 39b by using the second link arm 60. In the present embodiment, a case where a guide groove 70 in which a second pin 33 moves while sliding is used instead of the second link arm 60 will be described. Note that a description of the same configuration as that of Embodiment 2 will be omitted.

Figure 20:
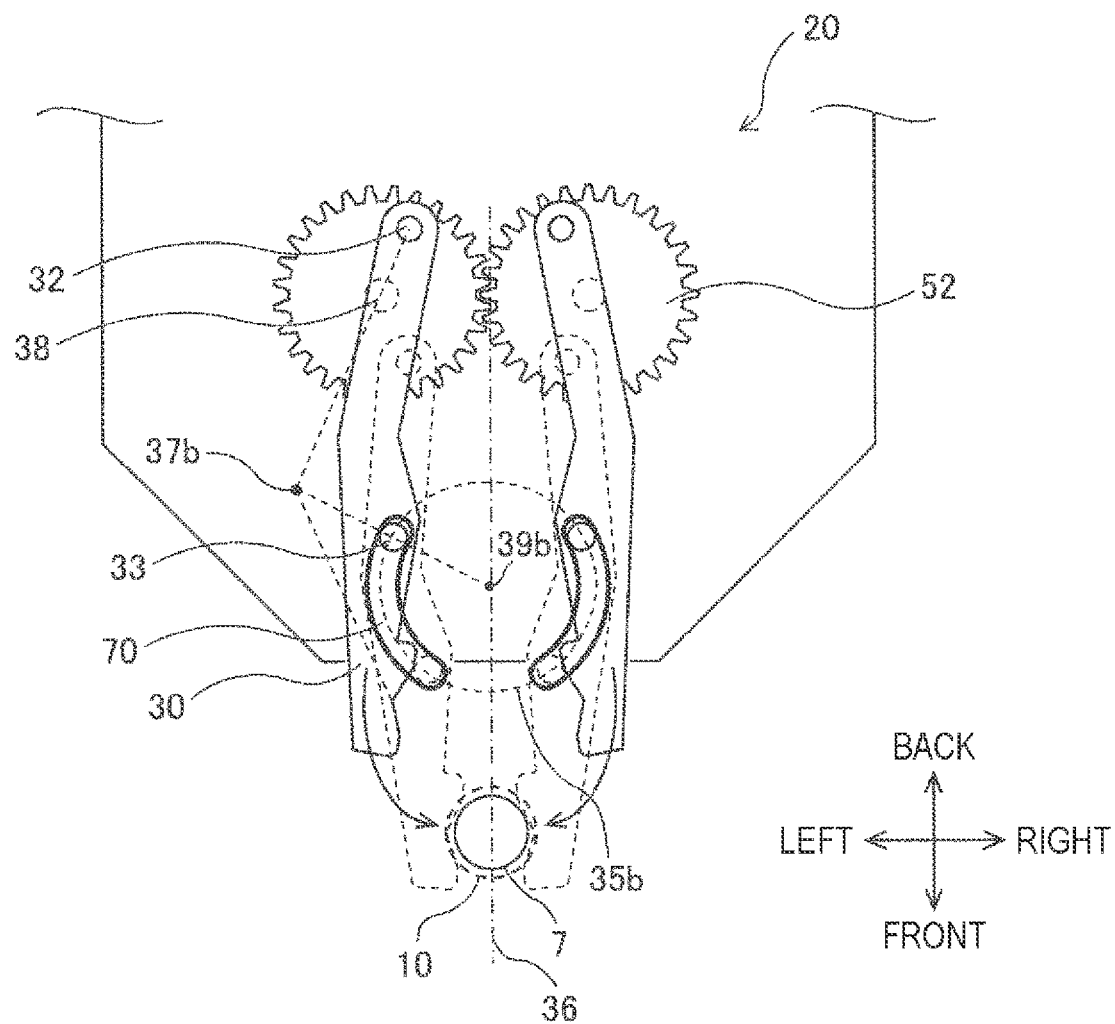
FIG. 20 is a top view illustrating a configuration and an operation of a sample container gripping apparatus of Embodiment 3.

A configuration of a sample container gripping apparatus 20 of the present embodiment will be described with reference to FIG. 20. As in Embodiment 2, the sample container gripping apparatus 20 of the present embodiment includes a pair of clamps 30 and a pair of third gears 52 arranged bilaterally symmetrically, and the clamp 30 includes a contact surface 31, a first pin 32, and a second pin 33. As in Embodiment 2, the contact surface 31 is a surface that comes into contact with a sample container 7, and the first pin 32 is rotatably connected to the third gear 52. The second pin 33 of the present embodiment moves while sliding in the guide groove 70 provided along a second arc 35b centered on a second center 39b. Note that the guide grooves 70 are arranged bilaterally symmetrically with respect to a symmetry axis 36. A shape of the guide groove 70 is not limited to a shape along the second arc 35b, and may be a shape along the second arc 35a illustrated in FIG. 4.

With such a configuration, the second pin 33 of the present embodiment moves so as to draw the second arc 35b as the first pin 32 is driven. Then, the contact surface 31 moves in a tangential direction of an arc centered on an intersection point 37b between a straight line connecting the first pin 32 and the first center 38 and a straight line connecting the second pin 33 and the second center 39b. Note that, in FIG. 20, a state in which the sample container gripping apparatus 20 is positioned at an origin position is indicated by a solid line, a state in which the sample container 7 positioned at a sample collecting position 10 is gripped by the clamps 30 is indicated by a dotted line, and a moving direction of the contact surface 31 from the origin position to the gripping state is indicated by a curved arrow.

With the configuration described above, the sample container 7 can be gripped without allowing foreign matter such as abrasion powder generated from the pair of clamps 30 to be mixed into a sample accommodated in the sample container 7, as in Embodiment 2. In addition, since the sample container gripping apparatus 20 of the present embodiment also moves in the horizontal direction and grips the sample container 7 from the horizontal direction, it is possible to downsize the sample container 7 in the top-bottom direction. In addition, the pair of clamps 30 are kept outside of the conveyance path 23 until the sample carrier 8 is conveyed to the sample collecting position 10, and thus, do not hinder the conveyance of the sample container 7.

Embodiment 4

In Embodiments 1 to 3, a case where the sample container 7 on the sample carrier 8 conveyed by the carousel 21 is gripped has been described. In the present embodiment, a case where a sample container 7 conveyed along a linear conveyance path 80 having a linear shape included in the sample conveyance apparatus 3 is gripped instead of the sample container 7 conveyed along the arc-shaped conveyance path 23 will be described. Note that a description of the same configuration as that of Embodiment 1 will be omitted.

Figure 21:
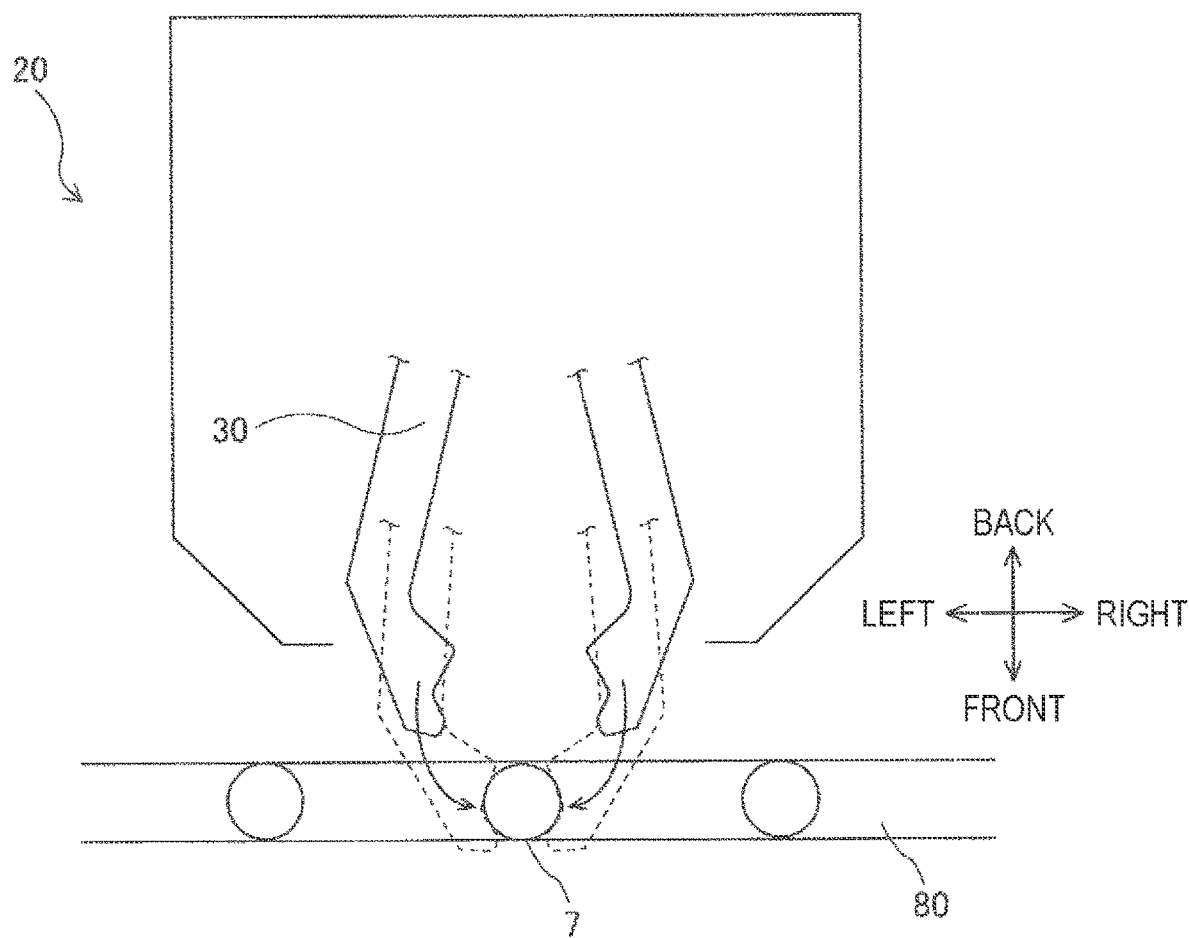
FIG. 21 is a top view illustrating a configuration and an operation of a sample container gripping apparatus of Embodiment 4.

A configuration of a sample container gripping apparatus 20 of the present embodiment will be described with reference to FIG. 21. The sample container gripping apparatus 20 of the present embodiment includes a pair of clamps 30 that are kept outside of a linear conveyance path 80 until the sample container 7 is conveyed to a prescribed position, and, when the sample container 7 is conveyed to the prescribed position, horizontally moves toward the linear conveyance path 80 so as to grip the sample container 7 from the horizontal direction. A driving mechanism of the clamp 30 may be the same as that in any of Embodiments 1 to 3. Note that, in FIG. 21, a state in which the sample container gripping apparatus 20 is positioned at an origin position is indicated by a solid line, a state in which the sample container 7 positioned at a prescribed position is gripped by the clamps 30 is indicated by a dotted line, and a moving direction of a distal end of the clamp 30 from the origin position to the gripping state is indicated by a curved arrow.

With the configuration described above, the sample container 7 can be gripped without allowing foreign matter such as abrasion powder generated from the pair of clamps 30 to be mixed into a sample accommodated in the sample container 7, as in Embodiments 1 to 3. In addition, since the sample container gripping apparatus 20 of the present embodiment also moves in the horizontal direction and grips the sample container 7 from the horizontal direction, it is possible to downsize the sample container 7 in the top-bottom direction. In addition, the pair of clamps 30 are kept outside of the linear conveyance path 80 until the sample container 7 is conveyed to a prescribed position, and thus, do not hinder the conveyance of the sample container 7.

Four embodiments for the sample container gripping apparatus, the sample conveyance apparatus, and the connection apparatus of the present invention have been described. Note that the sample container gripping apparatus, the sample conveyance apparatus, and the connection apparatus of the present invention are not limited to the above-described embodiments, and can be embodied by modifying the components without departing from the gist of the invention. In addition, a plurality of components disclosed in the above embodiments may be appropriately combined. Further, some components may be deleted from all the components shown in the above embodiments.

REFERENCE SIGNS LIST 1 automated sample examination system
2 pre-processing apparatus
3 sample conveyance apparatus
4 sample buffer
5 connection apparatus
6 analysis apparatus
7 sample container
8 sample carrier
9 control apparatus
10 sample collecting position
11 sample conveying-in path
12 sample conveying-out path
13 carrier separation portion
14 reading unit
20 sample container gripping apparatus
21 carousel
22 claw
23 conveyance path
30 clamp
31 contact surface
32 first pin
33 second pin
34 first arc
35 second arc
36 symmetry axis
37 intersection point
38 first center
39 second center
40 motor
41 rotation shaft
42 crank arm
43 coupling shaft
44 coupling plate
45 transmission shaft
46 spring
47 spring fixing portion
48 elongated hole
49 first gear
50 first gear shaft
51 second gear
52 third gear
53 link arm
54 first detection plate
55 second detection plate
56 first sensor
57 second sensor
58 third sensor
60 second link arm 70 guide groove
80 linear conveyance path

The invention claimed is:

1. A sample container gripping apparatus for gripping a sample container accommodating a sample, the sample container gripping apparatus comprising:
   a pair of clamps configured to be kept outside of a conveyance path, which is for conveying a sample carrier upon which the sample container is placed, until the sample carrier is conveyed to a prescribed position and, when the sample carrier is conveyed to the prescribed position, move horizontally toward the conveyance path so as to grip the sample container from a horizontal direction at the prescribed position, wherein
   the pair of clamps each include a contact surface that is provided at one end of the clamp and comes into contact with the sample container, a first pin that is provided at the other end of the clamp, and a second pin that is provided between both ends of the clamp, and are arranged bilaterally symmetrically,
   the second pin moves on a second arc as the first pin is driven on a first arc,
   a straight line connecting a center of the first arc and the first pin intersects with a straight line connecting a center of the second arc and the second pin, and
   wherein the center of the second arc is positioned outside the pair of clamps.

2. The sample container gripping apparatus according to claim 1, wherein the center of the second arc is positioned on a symmetry axis of the pair of clamps.

3. The sample container gripping apparatus according to claim 1, wherein the second arc is formed by a link arm having one end rotatably connected to the second pin and the other end axially supported to be rotatable.

4. A sample conveyance apparatus that conveys a sample container accommodating a sample, the sample conveyance apparatus comprising:
   the sample container gripping apparatus according to claim 1.

5. A connection apparatus that connects between a sample conveyance apparatus that conveys a sample container accommodating a sample and an analysis apparatus that analyzes the sample, the connection apparatus comprising:
   the sample container gripping apparatus according to claim 1.

6. A sample container gripping apparatus for gripping a sample container accommodating a sample, the sample container gripping apparatus comprising:
   a pair of clamps configured to be kept outside of a conveyance path, which is for conveying a sample carrier upon which the sample container is placed, until the sample carrier is conveyed to a prescribed position and, when the sample carrier is conveyed to the prescribed position, move horizontally toward the conveyance path so as to grip the sample container from a horizontal direction at the prescribed position, wherein
   the pair of clamps each include a contact surface that is provided at one end of the clamp and comes into contact with the sample container, a first pin that is provided at the other end of the clamp, and a second pin that is provided between both ends of the clamp, and are arranged bilaterally symmetrically,
   the second pin moves on a second arc as the first pin is driven on a first arc,
   a straight line connecting a center of the first arc and the first pin intersects with a straight line connecting a center of the second arc and the second pin,
   the sample container gripping apparatus further comprises:
   a motor that generates a rotational driving force;
   a transmission portion that transmits the rotational driving force to the first pin; and
   a gripping sensor which is a sensor that detects gripping of the sample container by the pair of clamps,
   the transmission portion includes:
   an elastic portion that is stretched by the rotational driving force after the contact surface comes into contact with the sample container;
   a crank arm having one end fixedly connected to a rotation shaft of the motor; and
   a coupling plate having one end provided with a coupling shaft rotatably connected to the other end of the crank arm and the other end provided with a transmission shaft that transmits the rotational driving force, and
   the gripping sensor detects that the sample container has been gripped, when the coupling shaft has moved toward a side opposite to a side on which the transmission shaft is present with respect to the rotation shaft so that a line connecting the coupling shaft and the transmission shaft is positioned behind a center of the rotation shaft.

7. The sample container gripping apparatus according to claim 6, further comprising:
   a gear to which the transmission shaft is rotatably connected and which drives the first pin; and
   a container sensor which is a sensor that detects that there is no sample container at the prescribed position,
   wherein the container sensor detects that there is no sample container at the prescribed position, when the gear has rotated by a prescribed rotation angle.

8. A sample container gripping apparatus for gripping a sample container accommodating a sample, the sample container gripping apparatus comprising:
   a pair of clamps configured to be kept outside of a conveyance path, which is for conveying a sample carrier upon which the sample container is placed, until the sample carrier is conveyed to a prescribed position and, when the sample carrier is conveyed to the prescribed position, move horizontally toward the conveyance path so as to grip the sample container from a horizontal direction at the prescribed position, wherein
   the pair of clamps each include a contact surface that is provided at one end of the clamp and comes into contact with the sample container, a first pin that is provided at the other end of the clamp, and a second pin that is provided between both ends of the clamp, and are arranged bilaterally symmetrically,
   the second pin moves on a second arc as the first pin is driven on a first arc,
   a straight line connecting a center of the first arc and the first pin intersects with a straight line connecting a center of the second arc and the second pin, and
   the second arc is formed by a guide groove in which the second pin slides.

* * * * *